US012794623B2

(12) United States Patent
Huang et al.

(10) Patent No.: US 12,794,623 B2
(45) Date of Patent: Nov. 10, 2026

(54) METHOD AND APPARATUS FOR TRANSMITTING SIDELINK POSITIONING REFERENCE SIGNAL IN A WIRELESS COMMUNICATION SYSTEM

(71) Applicant: ASUS Technology Licensing Inc., Taipei City (TW)

(72) Inventors: Chun-Wei Huang, Taipei City (TW); Ming-Che Li, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 338 days.

(21) Appl. No.: 18/409,621

(22) Filed: Jan. 10, 2024

(65) Prior Publication Data

US 2024/0250786 A1 Jul. 25, 2024

Related U.S. Application Data

(60) Provisional application No. 63/438,851, filed on Jan. 13, 2023.

(51) Int. Cl.
*H04L 5/00* (2006.01)
*H04W 72/25* (2023.01)
*H04W 74/0808* (2024.01)

(52) U.S. Cl.
CPC ........... *H04L 5/0048* (2013.01); *H04W 72/25* (2023.01); *H04W 74/0808* (2013.01)

(58) Field of Classification Search
CPC .. H04L 5/0048; H04W 72/25; H04W 74/0808
See application file for complete search history.

(56) References Cited

U.S. PATENT DOCUMENTS

2021/0219268 A1* 7/2021 Li .......................... H04W 72/02
2022/0053289 A1* 2/2022 Liu ........................ G01S 1/0428
(Continued)

FOREIGN PATENT DOCUMENTS

CN 114071430 A 2/2022
WO 2022184651 A1 9/2022
(Continued)

OTHER PUBLICATIONS

"Thread#2 for AI 7.2.4.6 QoS management"; 3GPP TSG RAN WG1 #101, R1-200XXXX, May 25- Jun. 5, 2020, 13 pages.
(Continued)

*Primary Examiner* — Ajay Cattungal
(74) *Attorney, Agent, or Firm* — Skaar Ulbrich Macari, P.A.

(57) ABSTRACT

Methods, systems, and apparatuses are provided for a first device in a wireless communication system comprising receiving configuration for configuring a first dedicated sidelink resource pool for transmitting a Sidelink Positioning Reference Signal (SL-PRS) and a second sidelink resource pool for at least transmitting Physical Sidelink Shared Channel (PSSCH), using, when the first device attempts to transmit PSSCH and a second SL-PRS in the second sidelink resource pool in slot m, SL Channel Occupancy Ratio (CR) and SL Channel Busy Ratio (CBR) evaluated or measured or determined in slot m-k2 (in the second sidelink resource pool) for the PSSCH and the second SL-PRS, wherein k2 corresponds to a second congestion control processing time, and using, when the first device attempts to transmit a first SL-PRS in the first dedicated sidelink resource pool in slot n, SL-PRS-CR and SL-PRS-CBR evaluated or measured or determined in slot n-k1 (in the first dedicated sidelink resource pool) for the
(Continued)

first SL-PRS, wherein k1 corresponds to a first congestion control processing time which is larger than or equal to k2.

19 Claims, 16 Drawing Sheets

(56) References Cited

U.S. PATENT DOCUMENTS

| | | | | |
|---|---|---|---|---|
| 2023/0198708 | A1 | 6/2023 | Hong et al. | |
| 2023/0284242 | A1 | 9/2023 | Ko | |
| 2023/0337171 | A1 | 10/2023 | Baek et al. | |
| 2024/0357570 | A1* | 10/2024 | Yerramalli | H04L 5/0092 |
| 2025/0023696 | A1* | 1/2025 | Wang | H04L 5/0094 |
| 2025/0056571 | A1* | 2/2025 | Zhang | H04W 72/25 |
| 2025/0106878 | A1* | 3/2025 | Kumar | H04W 72/56 |
| 2025/0324222 | A1* | 10/2025 | Kumar | H04W 28/0289 |
| 2026/0040328 | A1* | 2/2026 | Nogami | H04W 64/00 |

FOREIGN PATENT DOCUMENTS

| | | | |
|---|---|---|---|
| WO | 2023122416 | A1 | 6/2023 |
| WO | 2023184481 | A1 | 10/2023 |

OTHER PUBLICATIONS

"Thread#2 for AI 7.2.4.6 QOS management"; 3GPP TSG RAN WG1 #101, R1-200XXXX, May 25-Jun. 5, 2020, 14 pages.

Office Action to the corresponding Korean patent application rendered by the Korean Intellectual Property Office (KIPO) on Apr. 6, 2026, 16 pages (including English translation).

Moderator (Qualcomm), R1-2212938, Moderator Summary #4 on potential solutions for SL positioning, 3GPP TSG RAN WG1 #111 (3GPP server publication date Nov. 21, 2022); 82 pages.

InterDigital, Inc., R1-2211723, Potential solutions for SL positioning, 3GPP TSG RAN WG1 #111 (3GPP server publication date Nov. 7, 2022); 19 pages.

Ericsson, R1-2200641, Remaining aspects of resource allocation procedures for power saving, TSG_RAN WG1_RL1 TSGR1_107B-E (3GPP server publication date Jan. 11, 2022); 15 pages.

* cited by examiner

METHOD AND APPARATUS FOR TRANSMITTING SIDELINK POSITIONING REFERENCE SIGNAL IN A WIRELESS COMMUNICATION SYSTEM

CROSS-REFERENCE TO RELATED APPLICATIONS

The present application claims priority to and the benefit of U.S. Provisional Patent Application Ser. No. 63/438,851, filed Jan. 13, 2023, which is fully incorporated herein by reference.

FIELD

This disclosure generally relates to wireless communication networks and, more particularly, to a method and apparatus for transmitting sidelink positioning reference signal in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for transmitting sidelink positioning reference signal in a wireless communication system.

In various embodiments, with this and other concepts, systems, and methods of the present invention, a method for a first device in a wireless communication system comprises receiving configuration for configuring a first dedicated sidelink resource pool for transmitting a Sidelink Positioning Reference Signal (SL-PRS) and a second sidelink resource pool for at least transmitting Physical Sidelink Shared Channel (PSSCH), using, when the first device attempts to transmit PSSCH and a second SL-PRS in the second sidelink resource pool in slot m, SL Channel Occupancy Ratio (CR) and SL Channel Busy Ratio (CBR) evaluated or measured or determined in slot m-k2 (in the second sidelink resource pool) for the PSSCH and the second SL-PRS, wherein k2 corresponds to a second congestion control processing time, and using, when the first device attempts to transmit a first SL-PRS in the first dedicated sidelink resource pool in slot n, SL-PRS-CR and SL-PRS-CBR evaluated or measured or determined in slot n-k1 (in the first dedicated sidelink resource pool) for the first SL-PRS, wherein k1 corresponds to a first congestion control processing time which is larger than or equal to k2.

In various embodiments, with this and other concepts, systems, and methods of the present invention, a method for a first device performing sidelink reference signal transmission in a wireless communication system comprises receiving configuration for configuring a first dedicated sidelink resource pool for transmitting SL-PRS, wherein each slot in the first dedicated sidelink resource pool comprises Orthogonal Frequency Division Multiplexing (OFDM) symbols for Physical Sidelink Control Channel (PSCCH) and OFDM symbols for SL-PRS, and determining a SL-PRS-Received Signal Strength Indicator (RSSI) based on an SL-PRS resource in OFDM symbols configured for the SL-PRS resource and corresponding PSCCH in the OFDM symbols for PSCCH in a slot.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP TS 38.213 V17.4.0 (2022 December) 3GPP; TSG RAN; NR; Physical layer procedures for control (Release 17); [2] 3GPP TS 38.214 V17.4.0 (2022 December) 3GPP; TSG RAN; NR; Physical layer procedures for data (Release 17); [3] 3GPP TS 38.212 V17.4.0 (2022 December) 3GPP; TSG RAN; NR; Multiplexing and channel coding (Release 17); [4] 3GPP TS 38.211 V17.1.0 (2022 March) 3GPP; TSG RAN; NR; Physical channels and modulation (Release 17); [5] 3GPP TS 38.321 V17.2.0 (2022 September) 3GPP; TSG RAN; NR; Medium Access Control (MAC) protocol specification (Release 17); [6] RP-213588, "Revised SID on Study on expanded and improved NR positioning", Intel; [7] RAN1 Chair's Notes of 3GPP TSG RAN WG1 #109-e; [8] RAN1 Chair's Notes of 3GPP TSG RAN WG1 #110; [9] RAN1 Chair's Notes of 3GPP TSG RAN WG1 #110bis-e; RAN1 Chair's Notes of 3GPP TSG RAN WG1 #111; 3GPP TS 38.215 V17.2.0 (2022 September) 3GPP; TSG RAN; NR; Physical layer measurements (Release 17). The standards and documents listed above are hereby expressly and fully incorporated herein by reference in their entirety.

Figure 1:
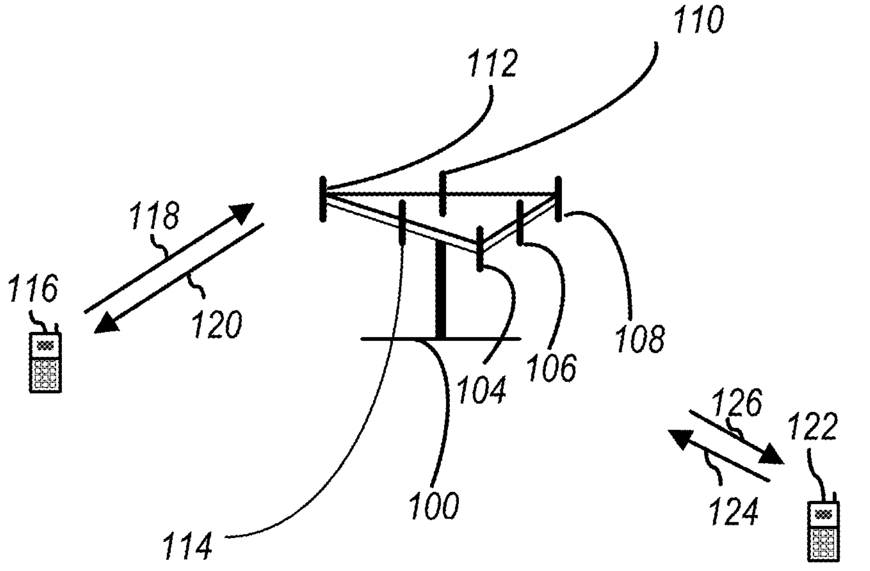
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
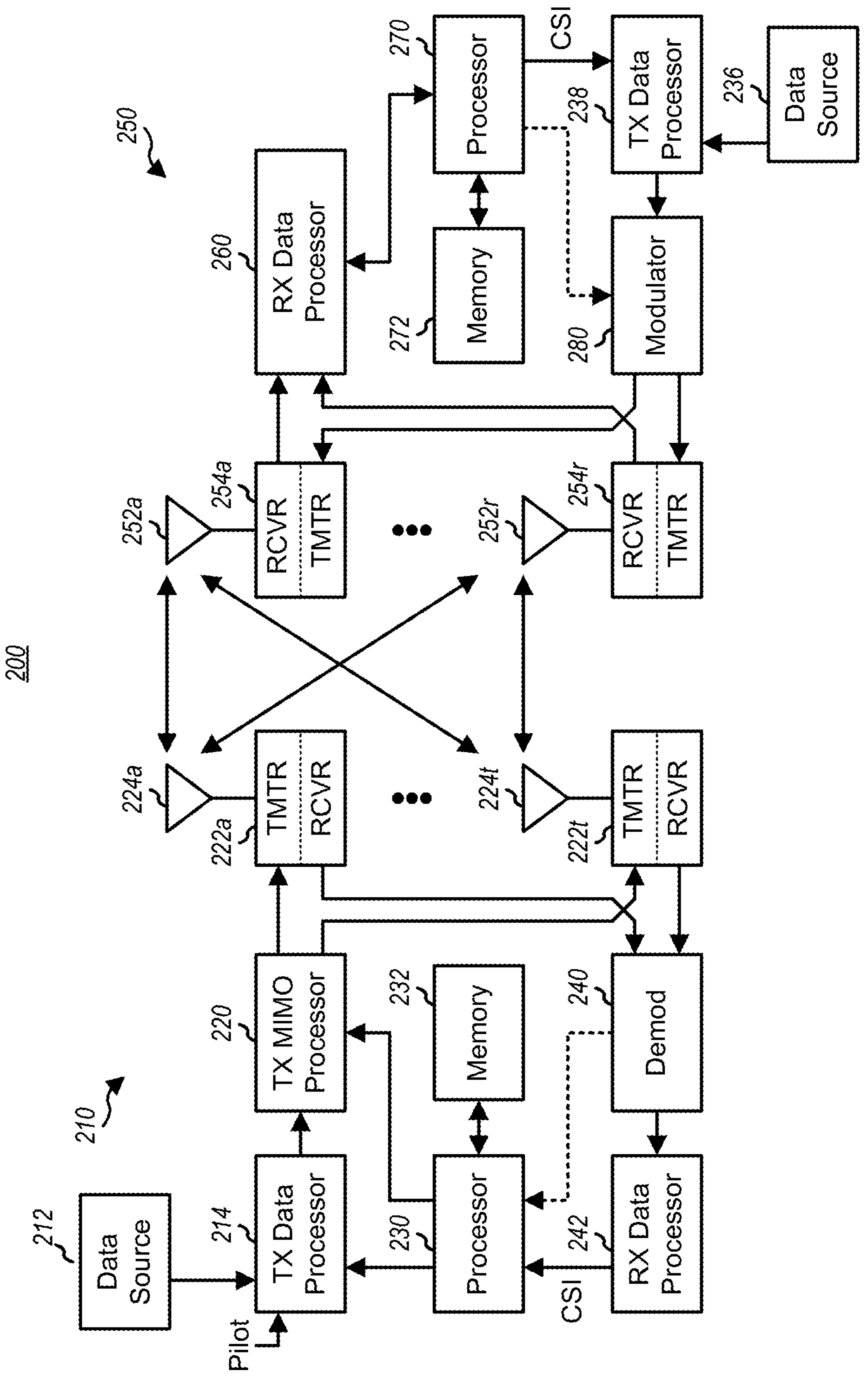
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides NT modulation symbol streams to Nr transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Nr modulated signals from transmitters 222*a* through 222*t* are then transmitted from Nr antennas 224*a* through 224*t*, respectively.

At receiver system 250, the transmitted modulated signals are received by NR antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
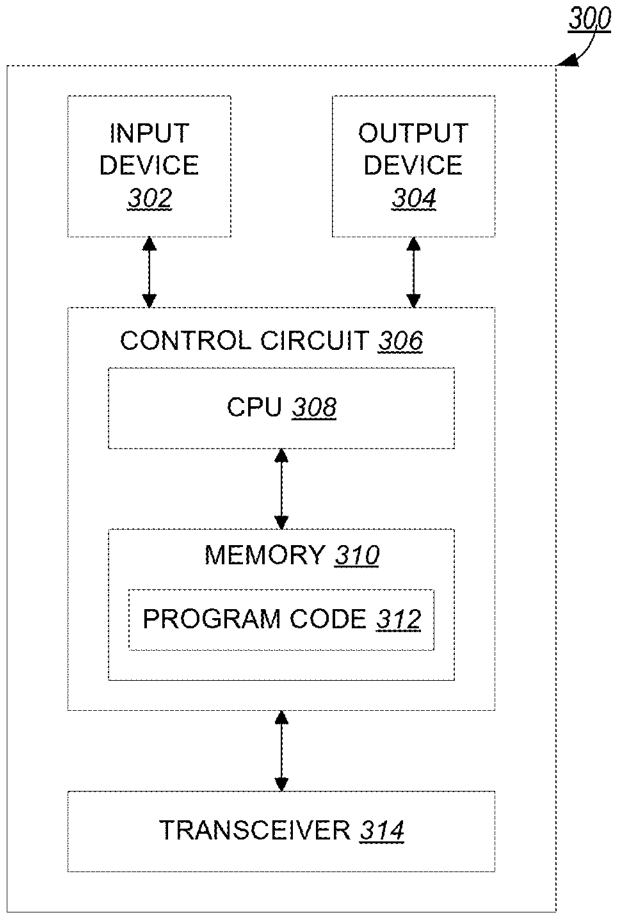
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
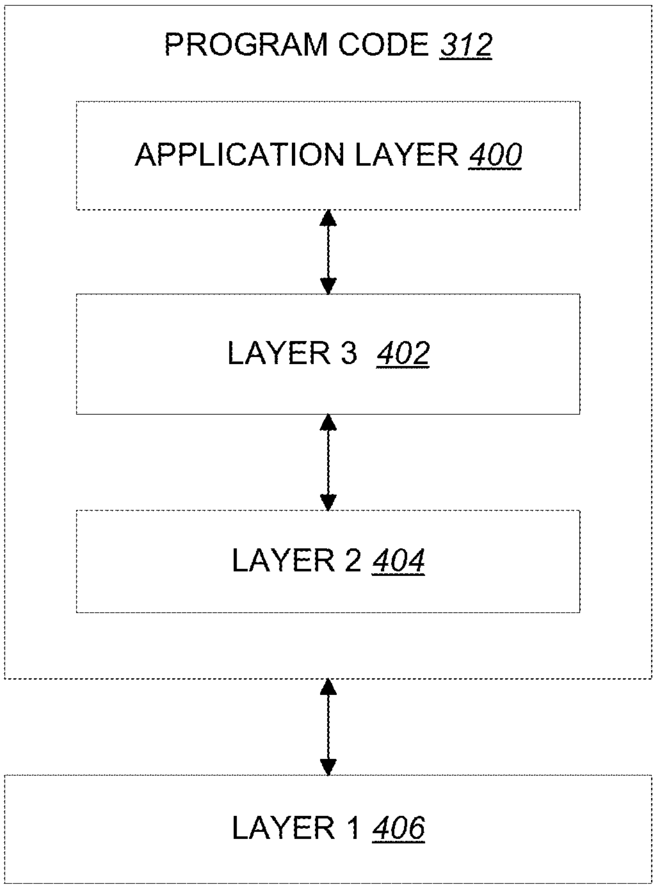
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

Any two or more than two of the following paragraphs, (sub-)bullets, points, actions, or claims described in each invention paragraph or section may be combined logically, reasonably, and properly to form a specific method.

In TS 38.213 (e.g., [1] 3GPP TS 38.213 V17.4.0 (2022 December) 3GPP; TSG RAN; NR; Physical layer procedures for control (Release 17)), SL related procedure for control is specified below.

****************************QUOTATION [1] START****************************

16 UE Procedures for Sidelink

A UE is provided by SL-BWP-Config or SL-BWP-ConfigCommon a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by sl-TimeResource and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols. For an available slot with S-SS/PSBCH blocks, the first symbol and the number of consecutive symbols is predetermined.

The UE expects to use a same numerology in the SL BWP and in an active UL BWP in a same carrier of a same cell. If the active UL BWP numerology is different than the SL BWP numerology, the SL BWP is deactivated.

. . .

16.4 UE Procedure for Transmitting PSCCH

A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB of the lowest sub-channel of the associated PSSCH, for a PSCCH transmission with a SCI format 1-A.

A UE that transmits a PSCCH with SCI format 1-A using sidelink resource allocation mode 2 [6, TS 38.214] sets "Resource reservation period" as an index in sl-ResourceReservePeriodList corresponding to a reservation period provided by higher layers [11, TS 38.321], if the UE is provided sl-MultiReserveResource the values of the frequency resource assignment field and the time resource assignment field as described in [6, TS 38.214] to indicate N resources from a set $\{R_y\}$ of resources selected by higher layers as described in [11, TS 38.321] with N smallest slot indices $y_i$ for $0 \le i \le N-1$ such that $y_0 < y_1 > \ldots < y_{N-1} \le y_0 + 31$, where:

$N = \min(N_{selected}, N_{max\_reserve})$, where $N_{selected}$ is a number of resources in the set $\{R_y\}$ with slot indices $y_j$, $0 \le j \le N_{selected}-1$, such that $y_0 < y_1 > \ldots < y_{N_{selected}-1} \le y_0 + 31$, and $N_{max\_reserve}$ is provided by sl-MaxNumPerReserve each resource, from the set of $\{R_y\}$ resources, corresponds to $L_{subCH}$ contiguous sub-channels and a slot in a set of slots $$\{t_y'^{SL}\},$$

where $L_{subCH}$ is the number of sub-channels available for PSSCH/PSCCH transmission in a slot $$(t_0'^{SL}, t_1'^{SL}, t_2'^{SL}, \ldots)$$

is a set of slots in a sidelink resource pool [6, TS 38.214]

$y_0$ is an index of a slot where the PSCCH with SCI format 1-A is transmitted.

*****************************QUOTATION [1] END********************************

In TS 38.214 (e.g., [2] 3GPP TS 38.214 V17.4.0 (2022 December) 3GPP; TSG RAN; NR; Physical layer procedures for data (Release 17)), SL related procedure for data and SL CSI is specified below.

*****************************QUOTATION [2] START********************************

8 Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

The set of slots that may belong to a sidelink resource pool is denoted by $$(t_0^{SL}, t_1^{SL}, \ldots, t_{T_{max}-1}^{SL})$$

where $$0 \le t_i^{SL} < 10240 \times 2^{\mu}, \; 0 \le i < T_{max},$$

. . .

The slots in the set are arranged in increasing order of slot index.

The UE determines the set of slots assigned to a sidelink resource pool as follows:

a bitmap $$(b_0, b_1, \ldots, b_{L_{bitmap}-1})$$

associated with the resource pool is used where $L_{bitmap}$ the length of the bitmap is configured by higher layers.

a slot $$t_k^{sL}(0 \le k < 10240 \times 2^{\mu} - N_{S\text{-}SSB} - N_{nonSL} - N_{reserved})$$

belongs to the set if $b_{k'}=1$ where $k'=k \bmod L_{bitmap}$.

The slots in the set are re-indexed such that the subscripts i of the remaining slots $$t_i'^{SL}$$

are successive $\{0, 1, \ldots, T'_{max}-1\}$ where $T'_{max}$ is the number of the slots remaining in the set.

The UE determines the set of resource blocks assigned to a sidelink resource pool as follows:

The resource block pool consists of $N_{PRB}$ PRBs.

The sub-channel m for m=0, 1, . . . , numSubchannel−1 consists of a set of $n_{subCHsize}$ contiguous resource blocks with the physical resource block number $n_{PRB} = n_{subCHRBstart} + m \cdot n_{subCHsize} + j$ for j=0, 1, . . . , $n_{subCHsize}-1$, where $n_{subCHRBstart}$, $n_{subCHsize}$ and numSubchannel are given by higher layer parameters sl-StartRB-Subchannel, sl-SubchannelSize and sl-NumSubchannel, respectively A UE is not expected to use the last $N_{PRB} \bmod n_{subCHsize}$ PRBs in the resource pool.

8.1 UE Procedure for Transmitting the Physical Sidelink Shared Channel

Each PSSCH transmission is associated with an PSCCH transmission.

That PSCCH transmission carries the 1st stage of the SCI associated with the PSSCH transmission; the 2nd stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot one transport block is transmitted with up to two layers;

The number of layers (D) is determined according to the 'Number of DMRS port' field in the SCI;

The set of consecutive symbols within the slot for transmission of the PSSCH is determined according to clause 8.1.2.1;

The set of contiguous resource blocks for transmission of the PSSCH is determined according to clause 8.1.2.2;

. . .

The UE shall set the contents of the SCI format 2-A as follows:

the UE shall set value of the 'HARQ process number' field as indicated by higher layers.

the UE shall set value of the 'NDI' field as indicated by higher layers.

the UE shall set value of the 'Redundancy version' field as indicated by higher layers.

the UE shall set value of the 'Source ID' field as indicated by higher layers.

the UE shall set value of the 'Destination ID' field as indicated by higher layers.

the UE shall set value of the 'HARQ feedback enabled/disabled indicator' field as indicated by higher layers.

the UE shall set value of the 'Cast type indicator' field as indicated by higher layers.

the UE shall set value of the 'CSI request' field as indicated by higher layers.

. . .

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

The UE shall not transmit PSSCH in symbols which are not configured for sidelink. A symbol is configured for sidelink, according to higher layer parameters sl-StartSymbol and sl-LengthSymbols, where sl-StartSymbol is the symbol index of the first symbol of sl-LengthSymbols consecutive symbols configured for sidelink.

Within the slot, PSSCH resource allocation starts at symbol sl-StartSymbol+1.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSFCH, if PSFCH is configured in this slot.

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

. . .

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of msec.

The following higher layer parameters affect this procedure:

sl-Selection WindowList: internal parameter $T_{2min}$ is set to the corresponding value from higher layer parameter sl-Selection WindowList for the given value of $prio_{TX}$.

sl-Thres-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j = prio_{TX}$.

sl-RS-ForSensing selects if the UE uses the PSSCH-RSRP or PSCCH-RSRP measurement, as defined in clause 8.4.2.1.

sl-ResourceReservePeriodList sl-Sensing Window: internal parameter $T_0$ is defined as the number of slots corresponding to sl-Sensing Window msec sl-TxPercentageList: internal parameter X for a given $prio_{TX}$ is defined as sl-TxPercentageList ($prio_{TX}$) converted from percentage to ratio

. . .

The resource reservation interval, $P_{rsvp\_TX}$, if provided, is converted from units of msec to units of logical slots, resulting in $$P'_{rsvp\_TX}$$

according to clause 8.1.7.

When the resource pool is (pre-)configured with sl-AllowedResourceSelectionConfig including full sensing, and full sensing is configured in the UE by higher layers, the UE performs full sensing.

Notation $$\left(t_0'^{SL}, t_1'^{SL}, t_2'^{SL}, \ldots\right)$$

denotes the set of slots which belongs to the sidelink resource pool and is defined in Clause 8.

The following steps are used:

1) A candidate single-slot resource for transmission $R_{x,y}$ is defined as a set of $L_{subCH}$ contiguous sub-channels with sub-channel x+j in slot $$t_y'^{SL}$$

where j=0, . . . , $L_{subCH}-1$. The UE shall assume that any set of $L_{subCH}$ contiguous sub-channels included in the corresponding resource pool within the time interval $[n+T_1, n+T_2]$ correspond to one candidate single-slot resource for UE performing full sensing . . . , where selection of $T_1$ is up to UE implementation under $$0 \leq T_1 \leq T_{proc,1}^{SL}, \text{ where } T_{proc,1}^{SL}$$

is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).

. . .

The total number of candidate single-slot resources is denoted by $M_{total}$.

2) The sensing window is defined by the range of slots $$\left[n - T_0, n - T_{proc,0}^{SL}\right),$$

when the UE performs full sensing, where $T_0$ is defined above and $$T_{proc,0}^{SL}$$

is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

. . .

3) The internal parameter $Th(p_i, p_j)$ is set to the corresponding value of RSRP threshold indicated by the i-th field in sl-Thres-RSRP-List, where $i=p_i+(p_j-1)*8$.

4) The set $S_A$ is initialized to the set of all the candidate single-slot resources.

5) The UE shall exclude any candidate single-slot resource $R_{x,y}$ from the set $S_A$ if it meets all the following conditions:

the UE has not monitored slot $$t_m'^{SL}$$

in Step 2.

for any periodicity value allowed by the higher layer parameter sl-ResourceReservePeriodList and a hypothetical SCI format 1-A received in slot $$t_m'^{SL}$$

with 'Resource reservation period' field set to that periodicity value and indicating all subchannels of the resource pool in this slot, condition c in step 6 would be met.

5a) If the number of candidate single-slot resources $R_{x,y}$ remaining in the set $S_A$ is smaller than $X \cdot M_{total}$, the set $S_A$ is initialized to the set of all the candidate single-slot resources as in step 4.

6) The UE shall exclude any candidate single-slot resource $R_{x,y}$ from the set $S_A$ if it meets all the following conditions:

a) the UE receives an SCI format 1-A in slot $$t_m'^{SL},$$

and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];

b) the RSRP measurement performed, according to clause 8.4.2.1 for the received SCI format 1-A, is higher than $Th(prio_{RX}, prio_{TX})$;

c) the SCI format received in slot $$t_m'^{SL}$$

or the same SCI format which, if and only if the 'Resource reservation period' field is present in the received SCI format 1-A, is assumed to be received in slot(s)

$$t_{m+q \times P'_{rsvp\_TX}}'^{SL}$$

determines according to clause 8.1.5 the set of resource blocks and slots which overlaps with $$R_{x,y+j \times P'_{rsvp\_TX}}$$

for q=1, 2, . . . , Q and j=0, 1, . . . , $C_{resel}-1$. Here, $$P'_{rsvp\_RX}$$

is $P_{rsvp\_RX}$ converted to units of logical slots according to clause 8.1.7, $$Q = \left\lceil \frac{T_{scal}}{P_{rsvp\_RX}} \right\rceil$$

if $$P_{rsvp\_RX} < T_{scal} \text{ and } n' - m \leq P'_{rsvp\_RX},$$

where if the UE is configured with full sensing by its higher layer, $$t'^{SL}_{n'} = n$$

if slot n belongs to the set $$(t'^{SL}_0, t'^{SL}_1, \ldots, t'^{SL}_{T'_{max}-1}),$$

otherwise slot $$t'^{SL}_{n'}$$

is the first slot after slot n belonging to the set $$(t'^{SL}_0, t'^{SL}_1, \ldots, t'^{SL}_{T'_{max}-1});$$

If UE is configured with partial sensing by its higher layer, $$t'^{SL}_{n'} = t'^{SL}_{y_i} - T^{SL}_{proc,1}$$

if slot $$t'^{SL}_{y_i} - T^{SL}_{proc,1}$$

belongs to the set $$(t'^{SL}_0, t'^{SL}_1, \ldots, t'^{SL}_{T'_{max}-1}),$$

otherwise, slot $$t'^{SL}_{n'}$$

is the first slot after slot $$t'^{SL}_{y_i} - T^{SL}_{proc,1}$$

belonging to the set $$(t'^{SL}_0, t'^{SL}_1, \ldots, t'^{SL}_{T'_{max}-1}).$$

Otherwise Q=1. If the UE is configured with full sensing by its higher layer, $T_{scal}$ is set to selection window size $T_2$ converted to units of msec.

. . .

7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4.

. . .

The UE shall report set $S_A$ to higher layers.

. . .

. . .

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

'Time resource assignment' carries logical slot offset indication of N=1 or 2 actual resources when sl-MaxNumPerReserve is 2, and N=1 or 2 or 3 actual resources when sl-MaxNumPerReserve is 3, in a form of time RIV (TRIV) field which is determined as follows:

```
if N = 1
  TRIV = 0
elseif N = 2
  TRIV = t1
else
  if (t2 − t1 − 1) ≤ 15
    TRIV = 30(t2 − t1 − 1) + t1 + 31
  else
    TRIV = 30(31 − t2 + t1) + 62 − t1
  end if
end if
```

where the first resource is in the slot where SCI format 1-A was received, and $t_i$ denotes i-th resource time offset in logical slots of a resource pool with respect to the first resource where for N=2, $1 \leq t_1 \leq 31$; and for N=3, $1 \leq t_1 \leq 30$, $t_1 < t_2 \leq 31$.

The starting sub-channel $$n^{start}_{subCH,0}$$

of the first resource is determined according to clause 8.1.2.2. The number of contiguously allocated sub-channels for each of the N resources $L_{subCH} \geq 1$ and the starting sub-channel indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 2 then $$FRIV = n_{subCH,1}^{start} + \sum_{i=1}^{L_{subCH}-1}\left(N_{subchannel}^{SL} + 1 - i\right)$$

If sl-MaxNumPerReserve is 3 then $$FRIV = n_{subCH,1}^{start} + n_{subCH,2}^{start} \cdot \left(N_{subchannel}^{SL} + 1 - L_{subCH}\right) + \sum_{i=1}^{L_{subCH}-1}\left(N_{subchannel}^{SL} + 1 - i\right)^2$$

where $$n_{subCH,1}^{start}$$

denotes the starting sub-channel index for the second resourc $$n_{subCH,2}^{start}$$

denotes the starting sub-channel index for the third resource $$N_{subchannel}^{SL}$$

is the number of sub-channels in a resource pool provided according to the higher layer parameter sl-NumSubchannel If TRIV indicates N<sl-MaxNumPerReserve, the starting sub-channel indexes corresponding to sl-MaxNumPerReserve minus N last resources are not used.

The number of slots in one set of the time and frequency resources for transmission opportunities of PSSCH is given by $C_{resel}$ where $C_{resel}$=10*SL_RESOURCE_RESELECTION_COUNTER [10, TS 38.321] if configured else $C_{resel}$ is set to 1.

If a set of sub-channels in slot $$t'^{SL}_{m}$$

is determined as the time and frequency resource for PSSCH transmission corresponding to the selected sidelink grant (described in [10, TS 38.321]), the same set of sub-channels in slots $$t'^{SL}_{m+j\times P'_{rsvp\_TX}}$$

are also determined for PSSCH transmissions corresponding to the same sidelink grant where j=1, 2, . . . , $C_{resel}-1$, $P_{rsvp\_TX}$, if provided, is converted from units of msec to units of logical slots, resulting in $$P'_{rsvp\_TX}$$

according to clause 8.1.7, and $$\left(t'^{SL}_{0}, t'^{SL}_{1}, t'^{SL}_{2}, \ldots\right)$$

is determined by Clause 8. Here, $P_{rsvp\_TX}$ is the resource reservation interval indicated by higher layers.

8.1.6 Sidelink Congestion Control in Sidelink Resource Allocation Mode 2

If a UE is configured with higher layer parameter sl-CR-Limit and transmits PSSCH in slot n, the UE shall ensure the following limits for any priority value k;

$$\sum_{i\geq k} CR(i) \leq CR_{Limit}(k)$$

where CR(i) is the CR evaluated in slot n-N for the PSSCH transmissions with 'Priority' field in the SCI set to i, and $CR_{Limit}$(k) corresponds to the high layer parameter sl-CR-Limit that is associated with the priority value k and the CBR range which includes the CBR measured in slot n-N, where N is the congestion control processing time.

The congestion control processing time N is based on u of Table 8.1.6-1 and Table 8.1.6-2 for UE processing capability 1 and 2 respectively, where μ corresponds to the subcarrier spacing of the sidelink channel with which the PSSCH is to be transmitted. A UE shall only apply a single processing time capability in sidelink congestion control.

TABLE 8.1.6-1

Congestion control processing time for processing timing capability 1

| μ | Congestion control processing time N [slots] |
|---|---|
| 0 | 2 |
| 1 | 2 |
| 2 | 4 |
| 3 | 8 |

TABLE 8.1.6-2

Congestion control processing time for processing timing capability 2

| μ | Congestion control processing time N [slots] |
|---|---|
| 0 | 2 |
| 1 | 4 |
| 2 | 8 |
| 3 | 16 |

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A, 2-B and 2-C, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A, 2-B and 2-C, and associated PSSCH resource configuration configured by higher layers. The UE is not required to decode more than one PSCCH at each PSCCH resource candidate.

*****************************QUOTATION [2] END********************************

In TS 38.212 (e.g., [3] 3GPP TS 38.212 V17.4.0 (2022 December) 3GPP; TSG RAN; NR; Multiplexing and channel coding (Release 17)), SCI format for sidelink is specified below.

*****************************QUOTATION [3] START*******************************

8.3 Sidelink Control Information on PSCCH

SCI carried on PSCCH is a $1^{st}$-stage SCI, which transports sidelink scheduling information.

8.3.1 $1^{st}$-Stage SCI Formats

The fields defined in each of the $1^{st}$-stage SCI formats below are mapped to the information bits $a_0$ to $a_{A-1}$ as follows:

. . .

8.3.1.1 SCI Format 1-A

SCI format 1-A is used for the scheduling of PSSCH and $2^{nd}$-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321]. Value '000' of Priority field corresponds to priority value '1', value '001' of Priority field corresponds to priority value '2', and so on.

Frequency resource assignment—

$$\left\lceil \log_2\left(\frac{N_{subChannel}^{SL}\left(N_{subChannel}^{SL}+1\right)}{2}\right)\right\rceil$$

bits when the value of the higher layer parameter sl-MaxNumPerReserve is configured to 2; otherwise $$\left\lceil \log_2\left(\frac{N_{subChannel}^{SL}\left(N_{subChannel}^{SL}+1\right)\left(2N_{subChannel}^{SL}+1\right)}{6}\right)\right\rceil$$

bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period–$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern–$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format—2 bits as defined in Table 8.3.1.1-1.

. . .

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by the following:

$N_{reserved}$ bits as configured by higher layer parameter sl-NumReservedBits, with value set to zero, if higher layer parameter sl-IndicationUE-B is not configured, or if higher layer parameter sl-IndicationUE-B is configured to 'disabled';

($N_{reserved}$–1) bits otherwise, with value set to zero.

. . .

TABLE 8.3.1.1-1

$2^{nd}$-stage SCI formats

| Value of 2nd-stage SCI format field | 2nd-stage SCI format |
|---|---|
| 00 | SCI format 2-A |
| 01 | SCI format 2-B |
| 10 | SCI format 2-C |
| 11 | Reserved |

8.4 Sidelink Control Information on PSSCH

SCI carried on PSSCH is a $2^{nd}$-stage SCI, which transports sidelink scheduling information, and/or inter-UE coordination related information.

8.4.1 $2^{nd}$-Stage SCI Formats

The fields defined in each of the 2nd-stage SCI formats below are mapped to the information bits $a_0$ to $a_{A-1}$ as follows:

. . .

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.

New data indicator—1 bit.

Redundancy version—2 bits as defined in Table 7.3.1.1.1-2.

Source ID—8 bits as defined in clause 8.1 of [6, TS 38.214].

Destination ID—16 bits as defined in clause 8.1 of [6, TS 38.214].

HARQ feedback enabled/disabled indicator—1 bit as defined in clause 16.3 of [5, TS 38.213].

Cast type indicator—2 bits as defined in Table 8.4.1.1-1 and in clause 8.1 of [6, TS 38.214].

CSI request—1 bit as defined in clause 8.2.1 of [6, TS 38.214] and in clause 8.1 of [6, TS 38.214].

TABLE 8.4.1.1-1

| Cast type indicator | |
|---|---|
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

. . .

*****************************QUOTATION [3] END*******************************

In [6] RP-213588, "Revised SID on Study on expanded and improved NR positioning", Intel, SID on Study on expanded and improved NR positioning is introduced.

*****************************QUOTATION [6] START*******************************

3 Justification

In Release 17, 3GPP RAN conducted studies on "NR Positioning Enhancements" and "Scenarios and requirements of in-coverage, partial coverage, and out-of-coverage NR positioning use cases".

The study on "Scenarios and requirements of in-coverage, partial coverage, and out-of-coverage NR positioning use cases" focussed on V2X and public safety use cases with the outcome being captured in TR38.845. Additionally, SA1 has developed requirements in TS22.261 for "Ranging based services", and has developed positioning accuracy requirements in TS22.104 for IIoT uses cases in out-of-coverage scenarios. There is a need for 3GPP to study and develop sidelink positioning solutions that can support the use cases, scenarios and requirements identified during these activities.

The study on "NR Positioning Enhancements" investigated higher accuracy, and lower latency location, high integrity and reliability requirements resulting from new applications and industry verticals for 5G. Some of the enhancements identified during that work have been specified during the Rel-17 Work Item on "NR Positioning Enhancements", but there remain a number of opportunities for enhancement that have not yet been incorporated into the specifications.

*****************************QUOTATION [6] END*******************************

In RAN1 #109-e (e.g., [7] RAN1 Chair's Notes of 3GPP TSG RAN WG1 #109-e), there are some agreements on sidelink positioning.

*****************************QUOTATION [7] START*******************************

Agreement

For evaluations for SL positioning:

Operation in FR1 with channel bandwidths of up to 100 MHz are considered.

Optional: Operation in FR2 with channel bandwidths of up to 400 MHz are considered.

Agreement

For SL positioning evaluation, simulation bandwidths of 10, 20, 40 and 100 MHz in FR1 can be used.

For SL positioning evaluation, simulation bandwidths of 100, 200 and 400 MHz in FR2 can be used.

Agreement

With regards to the numerologies of the SL-PRS, limit the study to those supported for NR Sidelink.

Note 1: NR Sidelink supports {15, 30, 60 kHz} in FR1 and {60, 120 kHz} in FR2

Note 2: This doesn't imply that SL-PRS FR2-specific optimization(s) are expected to be studied Agreement For the purpose of RAN1 discussion during this study item, at least the following terminology is used:

Target UE: UE to be positioned (in this context, using SL, i.e. PC5 interface).

Sidelink positioning: Positioning UE using reference signals transmitted over SL, i.e., PC5 interface, to obtain absolute position, relative position, or ranging information.

Ranging: determination of the distance and/or the direction between a UE and another entity, e.g., anchor UE.

Sidelink positioning reference signal (SL PRS): reference signal transmitted over SL for positioning purposes.

SL PRS (pre-)configuration: (pre-)configured parameters of SL PRS such as time-frequency resources (other parameters are not precluded) including its bandwidth and periodicity.

Continue discussion on additional terminology clarification(s) such as: Initiator UE, Responder UE, Sidelink Positioning group, reference UE, etc, including whether such terminology is needed within RAN1 discussion.

Agreement

For the purpose of RAN1 discussion during this study item, at least the following terminology is used:

Anchor UE: UE supporting positioning of target UE, e.g., by transmitting and/or receiving reference signals for positioning, providing positioning-related information, etc., over the SL interface.

FFS: clarification of the knowledge of the location of the anchor UE

Agreement

With regards to the frequency domain pattern, study further a Comb-N SL-PRS design. Study at least the following aspects:

N>=1 (where N=1 corresponds to full RE mapping pattern)

Fully staggered SL-PRS pattern (e.g., M symbols of SL-PRS with comb-N with M=N and, at each symbol a different RE offset is used), Partially staggered SL-PRS pattern (e.g., M symbol(s) of SL-PRS with comb-N, with M<N, at each symbol a different RE offset is used), Unstaggered SL-PRS patterns (e.g., M symbol(s) of SL-PRS with comb-N, at each symbol a same RE offset is used, N>1)

The number of symbols of SL-PRS within a slot

Any relation to the comb-N option

RE offset pattern repetitions within a slot

FFS: Other frequency domain pattern(s)

Agreement

With regards to the SL Positioning resource allocation, study further the following 2 options for SL Positioning resource (pre-)configuration:

Option 1: Dedicated resource pool for SL-PRS

. . .

Option 2: Shared resource pool with sidelink communication.

Agreement

With regards to the SL-PRS resource allocation, study the following two schemes:

Scheme 1: Network-centric operation SL-PRS resource allocation (e.g. similar to a legacy Mode 1 solution)

The network (e.g. gNB, LMF, gNB & LMF) allocates resources for SL-PRS

Scheme 2: UE autonomous SL-PRS resource allocation (e.g. similar to legacy Mode 2 solution)

At least one of the UE(s) participating in the sidelink positioning operation allocates resources for SL-PRS Applicable regardless of the network coverage

*****************************QUOTATION [7] END*******************************

In RAN1 #110 (e.g., [8] RAN1 Chair's Notes of 3GPP TSG RAN WG1 #110), there are some agreements on sidelink positioning.

*****************************QUOTATION [8] START*******************************

Agreement

A new reference signal should be introduced for supporting SL positioning/ranging.

Agreement

Regarding SL-PRS resource allocation, both Scheme 1 and Scheme 2 should be introduced for supporting SL positioning/ranging:

Scheme 1: Network-centric operation SL-PRS resource allocation (e.g. similar to a legacy Mode 1 solution)

The network (e.g. gNB, LMF, gNB & LMF) allocates resources for SL-PRS.

Scheme 2: UE autonomous SL-PRS resource allocation (e.g. similar to legacy Mode 2 solution)

At least one of the UE(s) participating in the sidelink positioning operation allocates resources for SL-PRS Agreement With regards to the SL Positioning resource allocation, one of the following alternatives should be introduced for supporting SL positioning/ranging:

Alt. 1: only dedicated resource pool(s) can be (pre-) configured for SL-PRS

Alt. 2: either dedicated resource pool(s) and/or e-shared resource pool(s) with sidelink communication can be (pre-)configured for SL-PRS Note: whether other signals/channels can be present in the dedicated resource pool can be further discussed Agreement With regards to the frequency domain pattern, a Comb-N SL-PRS occupying M symbol(s) design should be introduced for the support of NR SL positioning Note: there could be multiple values for M, N Agreement Regarding Scheme 2 SL-PRS resource allocation, study at least the following aspects:

Resource selection mechanism for SL-PRS

Inter-UE coordination

Aspects for congestion control mechanisms for SL-PRS

Agreement

With regards to the frequency domain pattern for multi-symbol SL-PRS, prioritize partially and fully staggered SL-PRS.

Note: this does not preclude comb N=1

FFS: single symbol SL-PRS, if supported

*****************************QUOTATION [8] END*******************************

In RAN1 #110bis (e.g., [9] RAN1 Chair's Notes of 3GPP TSG RAN WG1 #110bis-e), there are some agreements on sidelink positioning.

*****************************QUOTATION [9] START*****************************

Agreement

Regarding Scheme 1 SL-PRS resource allocation, a transmitting UE receives a SL-PRS resource allocation signaling from the network. Consider one or more of the following options:

Opt. 1: through higher layers from the LMF

Opt. 2: through Dynamic grant, or through configured grant type 1/type 2 from gNB Up to further discussion which one or more of these shall be applicable Agreement With regards to the frequency and time domain pattern of a SL-PRS resource within a slot has the following characteristics:

With regards to the value N (comb size) and the number M of SL-PRS symbols within a slot excluding the symbol(s) used for AGC training/RxTx Turnaround:

At least the following values are considered as potential candidate values: N={1,2,4,6,8,12}

The symbols of a SL-PRS resource within a slot are consecutive symbols

Agreement

For a dedicated resource pool for SL positioning,

With regards to which channels can be included in the resource pool in addition to SL-PRS, consider the following options:

Opt. 1: No other channel can be included beyond SL-PRS

Opt. 2: PSCCH which carries SCI associated with SL-PRS transmission(s) is included Opt. 3: PSCCH which carries SCI associated with SL-PRS transmission(s) and PSSCH associated with SL-PRS transmission(s) are included Agreement With regards to the SL Positioning resource allocation, for SL Positioning resource (pre-)configuration in a shared resource pool with Rel-16/17/18 sidelink communication (if supported), backward compatibility with legacy Rel-16/17 UEs should be ensured.

Agreement

With regards to SL signaling of the reservation/indication of SL-PRS resource(s) for dedicated resource pool and shared resource pool (if supported) for positioning:

Option A.1: SCI can be used for reserving/indicating one or more SL-PRS resource(s)

Note: This does NOT mean that only SCI is being used. There can still be higher layer signaling for the purpose of indicating a part of SL-PRS configuration.

FFS: Whether SCI is single stage SCI or two stage SCI

FFS: SL-MAC-CE or other higher-layer signaling reservation/indication

Agreement

With regards to the Positioning methods supported using SL-PRS measurements at least the following measurements are considered:

SL Rx-Tx measurement

SL RSTD measurement

SL RSRP measurement

RSRPP measurement

RTOA measurement

SL Azimuth of arrival (AoA) and SL zenith of arrival (ZoA) measurement

Agreement

At least for a dedicated resource pool for positioning,

With regards to the bandwidth of SL-PRS transmission, downselect from the following alternatives:

Alt. 1: The bandwidth of SL-PRS can be same or smaller than that of the resource pool Alt. 2: The bandwidth of SL-PRS shall be the same as that of the resource pool

****************************QUOTATION [9] END******************************

In RAN1 #111 (e.g., RAN1 Chair's Notes of 3GPP TSG RAN WG1 #111), there are some agreements on sidelink positioning.

****************************QUOTATION START******************************

Agreement

With regards to the SL Positioning resource allocation, support

Alt. 2: either dedicated resource pool(s) and/or a shared resource pool(s) with sidelink communication can be (pre-) configured for SL-PRS.

Note: this does not imply that the design is the same for both types of resources pools Note: shared resources pool(s) should be supported with backward compatibility Agreement From RAN1 perspective, at least the following 2 operation scenarios are recommended for normative work:

Operation Scenario 1: PC5-only-based positioning.

Operation Scenario 2: Combination of Uu- and PC5-based positioning.

Agreement

For Scheme 2, with regards to Resource allocation mechanism for SL-PRS, pick one or both of the following options:

Option 1: A sensing based resource allocation should be introduced

Option 2: A random resource selection should be introduced

In either option 1 or 2, the legacy designs for UE autonomous resource allocation should be used as a starting point. Study if/what enhancements may be needed.

Agreement

A dedicated SL-PRS resource pool is (pre-)configured in the only SL BWP of a carrier.

****************************QUOTATION END******************************

In 3GPP TS 38.215 V17.2.0 (2022 September) 3GPP; TSG RAN; NR; Physical layer measurements (Release 17), measurement quantity is quoted below:

****************************QUOTATION START******************************

| 5.1.25 Sidelink received signal strength indicator (SL RSSI) | |
|---|---|
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the $2^{nd}$ OFDM symbol.<br>For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency,<br>RRC_IDLE inter-frequency,<br>RRC_CONNECTED intra-frequency,<br>RRC_CONNECTED inter-frequency |

| 5.1.26 Sidelink channel occupancy ratio (SL CR) | |
|---|---|
| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b]. |
| Applicable for | RRC_IDLE intra-frequency,<br>RRC_IDLE inter-frequency,<br>RRC_CONNECTED intra-frequency,<br>RRC_CONNECTED inter-frequency |

NOTE 1: a is a positive integer and b is 0 or a positive integer; a and b are determined by UE implementation with a+b+1=1000 or $1000 \cdot 2^{\mu}$ slots, according to higher layer parameter sl-TimeWindowSizeCR, b<(a+b+1)/2, and n+b shall not exceed the last transmission opportunity of the grant for the current transmission.

NOTE 2: SL CR is evaluated for each (re)transmission.

NOTE 3: In evaluating SL CR, the UE shall assume the transmission parameter used at slot n is reused according to the existing grant(s) in slot [n+1, n+b] without packet dropping.

NOTE 4: The slot index is based on physical slot index.

NOTE 5: SL CR can be computed per priority level

NOTE 6: A resource is considered granted if it is a member of a selected sidelink grant as defined in TS 38.321 [7].

| 5.1.27 Sidelink channel busy ratio (SL CBR) | |
|---|---|
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n − a, n − 1], wherein a is equal to 100 or $100 \cdot 2^{\mu}$ slots, according to higher layer parameter sl-TimeWindowSizeCBR. When UE is configured to perform partial sensing by higher layers (including when SL DRX is configured), SL RSSI is measured in slots where the UE performs partial sensing and where the UE performs PSCCH/PSSCH reception within the CBR measurement window. The calculation of SL CBR is limited within the slots for which the SL RSSI is measured. If the number of SL RSSI measurement slots within the CBR measurement window is below a (pre-)configured threshold, a (pre-)configured SL CBR value is used. |
| Applicable for | RRC_IDLE intra-frequency,<br>RRC_IDLE inter-frequency,<br>RRC_CONNECTED intra-frequency,<br>RRC_CONNECTED inter-frequency |

NOTE 1: The slot index is based on physical slot index.

*****************************QUOTATION END*******************************

For New Radio (NR) Release-16/17 sidelink design, sidelink slots can be utilized for Physical Sidelink Broadcast Channel (PSBCH) or Physical Sidelink Control Channel (PSCCH)/Physical Sidelink Shared Channel (PSSCH)/Physical Sidelink Feedback Channel (PSFCH) transmission/reception. PSBCH is Time Division Multiplexed (TDMed), in slot level, from PSCCH/PSSCH/PSFCH. That means that sidelink slots except slots for PSBCH can be utilized for PSCCH/PSSCH/PSFCH transmission/reception. Moreover, the concept of sidelink resource pool for sidelink communication is utilized for PSCCH/PSSCH and/or/PSFCH transmission/reception. A sidelink (communication) resource pool will comprise a set of sidelink slot (except slots for PSBCH) and a set of frequency resources. Different sidelink (communication) resource pools may be TDMed and/or Frequency Division Multiplexed (FDMed). More specifically, a PSCCH in one sidelink (communication) resource pool can only schedule PSSCH resource(s) in the same one sidelink (communication) resource pool. A PSCCH in one sidelink (communication) resource pool is not able to schedule PSSCH resource(s) in another/other sidelink (communication) resource pool. For a PSCCH/PSSCH, associated PSFCH is in the same sidelink (communication) resource pool, instead of in different sidelink (communication) resource pools.

One sidelink (communication) resource pool will comprise multiple sub-channels in frequency domain, wherein a sub-channel comprises multiple contiguous Physical Resource Blocks (PRBs) in frequency domain. One PRB comprises multiple Resource Elements (REs), e.g., one PRB consists of 12 REs. Configuration of the sidelink resource pool will indicate the number of PRBs of each sub-channel in the corresponding sidelink resource pool. Sub-channel based resource allocation in frequency domain is supported for PSSCH. For a PSSCH resource scheduled by a PSCCH in the same sidelink slot, a fixed relationship between the PSCCH and the PSSCH resource is specified, which means that the PSCCH will be located in the lowest (index of) sub-channel of the scheduled PSSCH resource. As for scheduled PSSCH resources in different slot(s), starting frequency position of the scheduled PSSCH resource will be scheduled/indicated by sidelink control information, instead of a fixed relationship.

In current NR Release-16/17 sidelink design, one Sidelink Control Information (SCI) could indicate at most three PSSCH resources via Frequency resource assignment and/or Time resource assignment in the SCI. The SCI may comprise a 1st stage SCI and a 2nd stage SCI. The 1st stage SCI may be transmitted via PSCCH. The 2nd stage SCI may be transmitted via multiplexed/multiplexing with the scheduled PSSCH resource in the same sidelink slot, e.g., the first PSSCH resource. In other words, the SCI can schedule at most two PSSCH resources in later sidelink slots, e.g., the second PSSCH resource and/or the third PSSCH resource. The at most three PSSCH resources are in different slots in a sidelink (communication) resource pool. The at most three PSSCH resources are within 32 consecutive slots in a sidelink resource pool. The at most three PSSCH resources are utilized/associated with a same data packet, e.g., a same Transport Block (TB) or a same Medium Access Control (MAC) Packet Data Unit (PDU). Note that standalone PSCCH/SCI is not supported in NR sidelink, which means that for each PSSCH transmission in a slot, there will be corresponding PSCCH/SCI transmission in the same slot, and vice versa.

When a Receiving/Reception (RX) User Equipment (UE) receives the one SCI in a specific slot, the specific slot would be a reference slot or a first slot for determining the (following) 32 consecutive slots (used for potential additional receptions associated with the one SCI or its relevant PSSCH) in a sidelink (communication) resource pool. The first PSSCH resource is in the specific slot where the one SCI is received. The starting sub-channel of the first PSSCH resource is the sub-channel in which the PSCCH is received. Time resource assignment in the SCI would indicate a Time Resource Indicator Value (TRIV). If the time resource indicator value is zero, the SCI schedules only one PSSCH resource, i.e., the first PSSCH resource. For configuration of maximum number per reserve being as 2, one time resource indicator value would provide information of one additional slot (in addition to the reference slot), e.g., the time resource indicator value indicates/derives a value 11, 1≤11≤31, wherein 11 means/denotes a first time offset, in logical slots of a sidelink resource pool, between the second PSSCH resource and the first PSSCH resource. For configuration of maximum number per reserve being as 3, one time resource indicator value would provide information of one or two additional slots (in additional to the reference slot), e.g., the time resource indicator value indicates/derives a value $t_1$ and/or $t_2$, $1 \le t_1 \le 30$ and $t_1 < t_2 \le 31$, wherein $t_1$ means/denotes a first time offset, in logical slots of a sidelink resource pool, between the second PSSCH resource and the first PSSCH resource, and wherein $t_2$ means/denotes a second time offset, in logical slots of the sidelink resource pool, between the third PSSCH resource and the first PSSCH resource. Frequency resource assignment would indicate a Frequency Resource Indicator Value (FRIV). For configuration of maximum number per reserve being as 2, one frequency resource indicator value would provide information of one starting sub-channel (for the second PSSCH resource) and a number of sub-channels $L_{subCH}$ (for each of the two PSSCH resources). For configuration of maximum number per reserve being as 3, one frequency resource indicator value would provide information of one or two starting sub-channels (for the second PSSCH resource and/or the third PSSCH resource respectively) and a number of sub-channels $L_{subCH}$ (for each of the three PSSCH resources). Moreover, resource reservation for another TB by an SCI could be (pre-)configured with enabled or not enabled or not configured in a sidelink (communication) resource pool. When a sidelink (communication) resource pool is configured with enabled such resource reservation, the sidelink (communication) resource pool is configured with a set of reservation period values. A possible reservation period could be 0, 1:99, 100, 200, 300, 400, 500, 600, 700, 800, 900, 1000 ms. A resource reservation period field in an SCI in the sidelink (communication) resource pool could indicate which reservation period value for (future) resource reservation. The size/number of the set of reservation period values could be from 1 to 16.

In current NR Release-16/17 sidelink design, there are two sidelink resource allocation modes defined for NR sidelink communication:

- Mode 1 is that the base station/network node can schedule sidelink resource(s) to be used by the UE for sidelink transmission(s);
- Mode 2 is that the UE determines (i.e., base station/network node does not schedule) sidelink transmission resource(s) within sidelink resources configured by the base station/network node or preconfigured sidelink resources.

For network scheduling mode, e.g., NR sidelink resource allocation mode 1, the network node may transmit a Sidelink (SL) grant, e.g., Downlink Control Information (DCI) format 3_0, on Uu interface for scheduling at most three PSSCH resources (for a same data packet). The sidelink grant comprises "time gap" field and "Lowest index of the subchannel allocation to the initial transmission" fields for indicating the first PSSCH resource and/or the PSCCH resource in the specific slot, and also comprises a "Frequency resource assignment" field and a "Time resource assignment" field for indicating the second PSSCH resource and/or the third PSSCH resource (if any). The sidelink grant also comprises a "resource pool index" for indicating one sidelink (communication) resource pool, wherein the scheduled at most three PSSCH resources are within the indicated one sidelink (communication) resource pool. The Transmitting/Transmission (TX) UE may perform PSCCH and PSSCH transmissions on PC5 interface, in response to the received sidelink grant, for a data packet. The Uu interface means the wireless interface for communication between the network and the UE. The PC5 interface means the wireless interface for communication (directly) between UEs/devices.

For UE (autonomous) selection mode, e.g., NR sidelink resource allocation mode 2, since transmission resource is not scheduled via the network node, the UE may require performing sensing before selecting a resource for transmission (e.g., sensing-based transmission), in order to avoid resource collision and interference from or to other UEs (especially UEs using NR sidelink). Full sensing is supported from NR Rel-16 sidelink, while partial sensing is supported from NR Rel-17 sidelink. Based on the result of the sensing procedure, the UE can determine a valid/identified resource set. The valid/identified resource set may be reported to higher layers (of the UE). The UE may (randomly) select one or multiple valid/identified resources from the valid/identified resource set to perform sidelink transmission(s) from the UE. The sidelink transmission(s) from the UE may be PSCCH and/or PSSCH transmission.

In NR Release-18 (e.g., [6] RP-213588), study on "NR Positioning Enhancements" will investigate higher accuracy, lower latency location, high integrity, and reliability requirements resulting from new applications and industry verticals for 5G. It will also study feasibility of potential solutions for SL positioning, considering relative positioning, ranging and absolute positioning, wherein the SL positioning is operated in a device-to-device interface or said PC5-interface between device and device. The device can mean or replaced as UE herein.

In RAN1 meetings (e.g., [7] RAN1 Chair's Notes of 3GPP TSG RAN WG1 #109-e; [8] RAN1 Chair's Notes of 3GPP TSG RAN WG1 #110; [9] RAN1 Chair's Notes of 3GPP TSG RAN WG1 #110bis-e; and [10] RAN1 Chair's Notes of 3GPP TSG RAN WG1 #111), RAN1 agreed to study RTT-type solutions using SL, Sidelink-Angle of Arrival (SL-AoA), Sidelink-Time Difference Of Arrival (SL-TDoA), Sidelink-Angle of Departure (SL-AoD) with regard to positioning methods supported using SL measurements. Accordingly, a new reference signal for SL positioning/ranging will be introduced, and existing DL PRS or Uplink (UL) Sounding Reference Signal Positioning (SRS-Pos) design and SL design framework can be used as a starting point. The new reference signal for SL positioning/ranging may be noted as Sidelink Positioning Reference Signal (SL-PRS). For supporting time-based positioning methods, larger bandwidth for SL-PRS is required for higher accuracy positioning. It is quite possible that the required bandwidth for SL-PRS may be 10 MHz, 20 MHz, or even more, especially in higher frequency bands. With regard to the SL Positioning resource allocation, RAN1 will study a further Option 1: Dedicated resource pool for SL-PRS and an Option 2: Shared resource pool with sidelink communication (i.e., PSCCH/PSSCH and/or PSFCH). A shared resource pool with sidelink communication means that SL-PRS transmission(s) are multiplexed in the sidelink resource pool with PSCCH/PSSCH resources (e.g., in NR Release 16/17/18 sidelink resource pool).

Moreover, sidelink control information may be provided by the TX UE for scheduling/indicating/allocating SL-PRS resources, in order to let the RX UE know where/when to receive/measure corresponding SL-PRS. The sidelink control information for scheduling/indicating/allocating SL-PRS resources may be multiplexed/transmitted in the dedicated resource pool for SL-PRS of option 1, or be transmitted on PSCCH in the shared sidelink resource pool of option 2.

Furthermore, given the larger bandwidth requirement of SL-PRS, Comb-N SL-PRS design can be supported for providing more available SL-PRS resources, and a configured/adjusted symbol number can be supported as one SL-PRS occasion. The potential candidate value of N may be 1, 2, 4, 6, 8, or 12. According to RAN1 #109-e (e.g., [7] RAN1 Chair's Notes of 3GPP TSG RAN WG1 #109-e), there are at least some possible designs of SL-PRS patterns, given M symbol and comb-N:

Fully staggered SL-PRS pattern, M=N, and at each symbol a different RE/comb offset is used;

Partially staggered SL-PRS pattern, M<N, at each symbol a different RE/comb offset is used;

Unstaggered SL-PRS patterns, N>1, at each symbol a same RE/comb offset is used.

Preferably in certain embodiments, for comb-N SL-PRS design/structure, possible frequency/comb offsets may be 0 to (N−1).

According to RAN1 #110 (e.g., [8] RAN1 Chair's Notes of 3GPP TSG RAN WG1 #110), scheme 1 and scheme 2 are introduced for SL-PRS resource allocation.

· Scheme 1: Network-centric operation SL-PRS resource allocation (e.g., similar to a legacy Mode 1 Solution
  The network (e.g., Next Generation Node B (gNB), Location Management Function (LMF), gNB & LMF) allocates resources for SL-PRS.

Scheme 2: UE autonomous SL-PRS resource allocation (e.g., similar to legacy Mode 2 solution)
  At least one of the UE(s) participating in the sidelink positioning operation allocates resources for SL-PRS.

For scheme 2, if concept of legacy NR Mode 2 is applied, the UE may perform sensing on SL-PRS resources in sensing duration, and then exclude candidate SL-PRS resources based on the sensing result. After the exclusion step, the UE may determine valid candidate SL-PRS resources and then randomly select some candidate SL-PRS resource(s) from that.

For scheme 1, the network node may transmit an SL grant for scheduling SL-PRS resource(s). There are some methods for designing the SL grant, e.g., (1) define extra fields in DCI format 3_0 (i.e., current sidelink grant for scheduling PSSCH resource) to load SL-PRS resource information, or (2) define a new DCI format exclusively for including SL-PRS resource information, wherein the new DCI format is with Cyclic Redundancy Check (CRC) scrambled by 'SL-PRS-Radio Network Temporary Identifier (RNTI)'. Other DCI format designs are also possible for the SL grant for SL-PRS resource information. The SL-PRS resource information in either DCI format design (1) or (2) or other DCI format design may include any of resource pool index for SL-PRS transmission, SL-PRS resource timing (e.g., which sidelink slot(s)), periodicity and/or offset, comb pattern, frequency offset (in unit of RE), sub-channel index(es)/number, number of symbols, SL-PRS occasion, etc.

Figure 5:
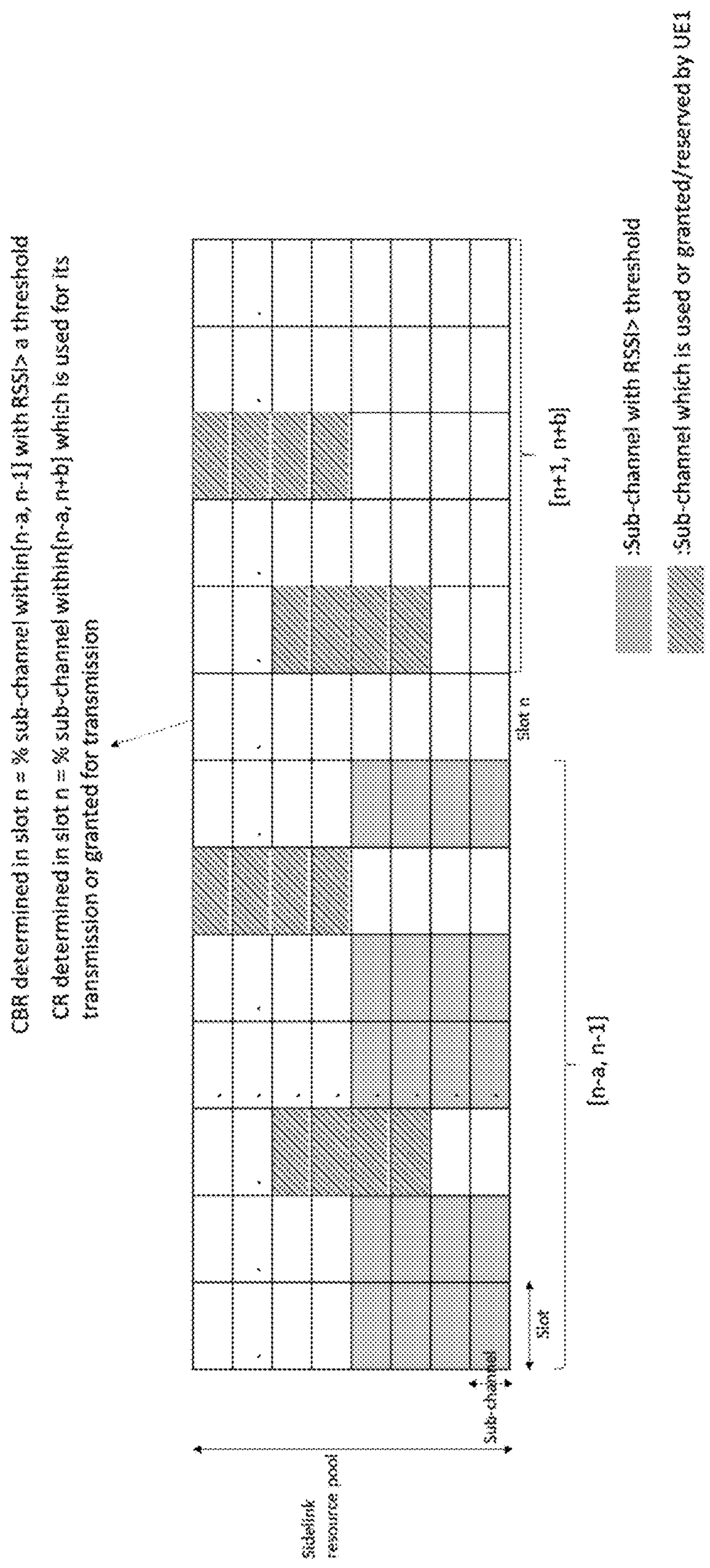
FIG. 5 is diagram showing that in mode-2 for PSSCH, CBR and/or CR measurement is determined in slot n, in accordance with embodiments of the present invention.

In mode-2 for PSSCH, Channel Busy Ratio (CBR) and/or Channel Occupancy Ratio (CR) measurement determined in slot n could be illustrated in FIG. 5. CBR would be determined based on past measurement results. CR would be determined as occupying condition of the UE itself which comprises past and future existing reserved sub-channel(s). The UE could be (pre-)configured with one or more CBR ranges and/or one or more CR limits. Each priority or one priority could associate with aespective one or more CBR ranges and/or respective one or more CR limits. Based on the measured CBR being within which CBR range and a given priority, the UE could determine one CR limit from the one or more CR limits for the given priority. UE would ensure its sub-channel occupancy or measured CR for one or more priority less than the given priority is smaller than or equal to the one determined CR limit for the given priority.

One issue in scheme 2 for transmitting SL-PRS may be congestion control. According to the current description of CBR and CR, one SL-PRS may occupy multiple or whole sub-channel(s) in a Transmission Time Interval (TTI) in a sidelink resource pool. However, due to comb-structure of SL-PRS design, there may be N SL-PRS resource multiplexed in the same region of sub-channels. It may be less chance for SL-PRS transmission since the derived/calculated/determined CBR for one TTI would be very congested (since current CBR is with aspect to sub-channels,) while the actual situation would have multiplexed SL-PRS for SL-PRS transmission (since one sub-channel may be utilized for N multiplexed SL-PRS resources). Thus, there is a need to design congestion control in scheme 2 for SL-PRS transmission.

Preferably in certain embodiments, as there may be a dedicated pool for SL-PRS transmission or a shared pool for SL-PRS transmission and PSSCH transmission, it is beneficial to design congestion control with respect to the introduction of SL-PRS.

Figure 6:
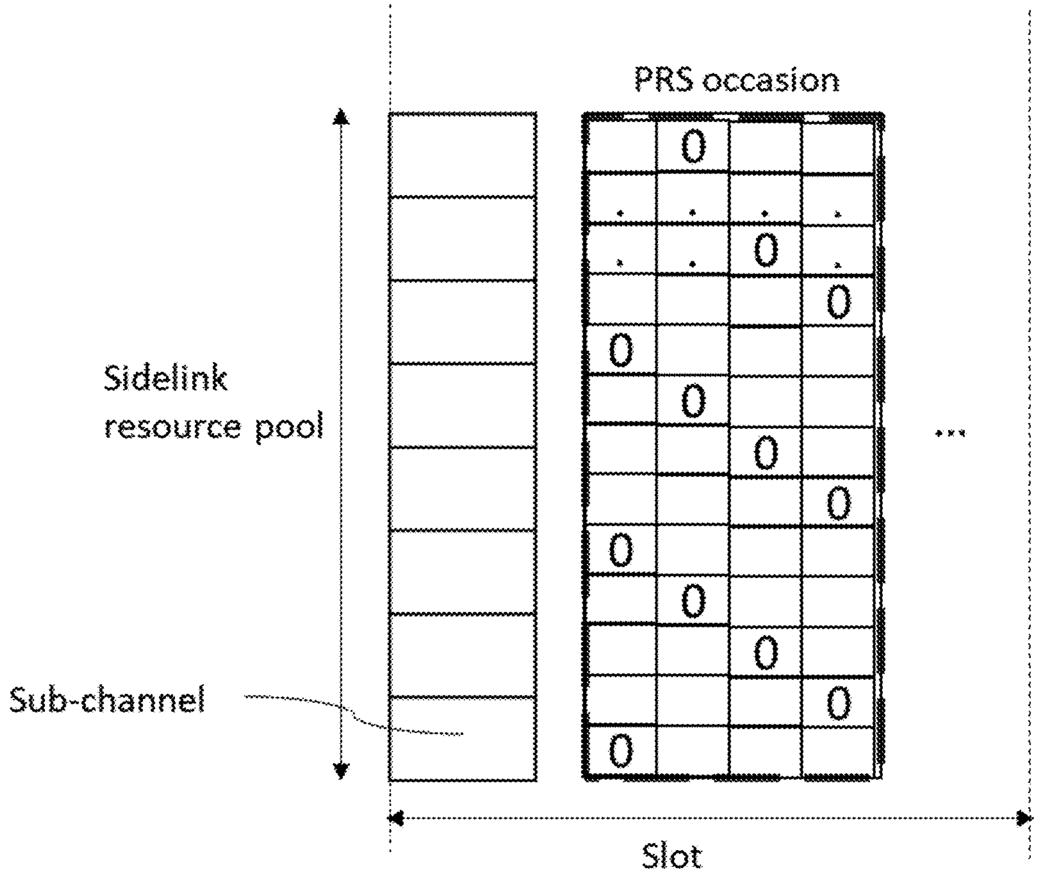
FIG. 6 is a diagram showing a given slot in a sidelink resource pool, assuming comb-4 for SL-PRS transmission, wherein one SL-PRS pattern (associated with 0 or RE/comb offset 0 in one SL-PRS occasion) may occupy whole sub-channels in a sidelink resource pool, in accordance with embodiments of the present invention.

One example could be illustrated in FIG. 6, in a given slot in a sidelink resource pool, assuming comb-4 for SL-PRS transmission. It could be illustrated that one SL-PRS pattern (associated with 0 or RE/comb offset 0 in one SL-PRS occasion) may occupy whole sub-channels in a sidelink resource pool. If Received Signal Strength Indicator (RSSI) of this SL-PRS pattern is measured being higher than a threshold, a determined CBR for whole sub-channels in the sidelink resource pool in a slot would be considered congested since all sub-channels in this slot would be deemed as higher than the threshold, but the actual situation is there are remaining N−1 (e.g., 3) SL-PRS resources among same sub-channel(s) in the sidelink resource pool. On the other hand, as partial resource(s) are used, SL RSSI measured from these partial resource(s) may cause inaccurate SL RSSI value based on average over whole sub-channels in the sidelink resource pool (e.g., SL RSSI would be divided by N due to only SL-PRS with pattern 0 is received).

Concept 1

This concept is to determine RSSI, CBR, or CR values for SL-PRS transmission in a given TTI based on the measurement result of PSCCH (e.g., 1-st stage SCI). Preferably in certain embodiments, one PSCCH would associate or occupy one sub-channel in a sidelink resource pool. Preferably in certain embodiments, the sidelink resource pool is dedicated for SL-PRS preferably with inclusion of PSCCH. Preferably in certain embodiments, the sidelink resource pool may not comprise PSSCH, PSFCH. Preferably in certain embodiments, PSCCH in a different sub-channel would schedule or indicate SL-PRS transmission with a different RE/comb offset. Preferably in certain embodiments, SL-PRS transmission may be performed within a set of sub-channels. Preferably in certain embodiments, cardinality of the set of sub-channels is the same or smaller than the number of sub-channels in the sidelink resource pool. Preferably in certain embodiments, for a given TTI, the PSCCH region and the SL-PRS region is separated in different symbol(s). Preferably in certain embodiments, one SL-PRS region may comprise X SL-PRS occasion in time domain. Preferably in certain embodiments, X≥1. Preferably in certain embodiments, when X≥1, different SL-PRS occasions are separated in different symbols. Preferably in certain embodiments, in a given TTI in a sidelink resource pool, the PSCCH region and the SL-PRS occasion are separated in time domain. Preferably in certain embodiments, one SL-PRS region may comprise Y SL-PRS frequency range. Preferably in certain embodiments, Y≥1. Preferably in certain embodiments, considering comb-N structure, one SL-PRS region would comprise at most N·X·Y SL-PRS transmission. Preferably in certain embodiments, one SL-PRS transmission could be replaced by one SL-PRS resource with an RE/comb offset. Preferably in certain embodiments, one TTI comprises one or more than one PSCCH region. Preferably in certain embodiments, there is at least N·X·Y sub-channels which is associated/utilized with or comprises PSCCH in the given TTI (if there is one PSCCH region in the given TTI). Preferably in certain embodiments, the N·X·Y sub-channels with PSCCH may be separated into one or more PSCCH regions. Preferably in certain embodiments, the UE determines CBR based on at least counting/calculating/measuring for a time interval comprising the given TTI. More specifically, CBR is determined based on how many sub-channel(s) among the N·X·Y sub-channels with RSSI are larger than a threshold. Alternatively, CBR is determined based on how many sub-channel(s) among all sub-channels with RSSI are larger than a threshold. Preferably in certain embodiments, the RSSI is measured or determined based on sub-channel and Orthogonal Frequency Division Multiplexing (OFDM) symbol(s) comprising PSCCH. Preferably in certain embodiments, for a given TTI, a total number of sub-channels (in the sidelink resource pool) may be larger than or equal to N·X·Y sub-channels.

Figure 10:
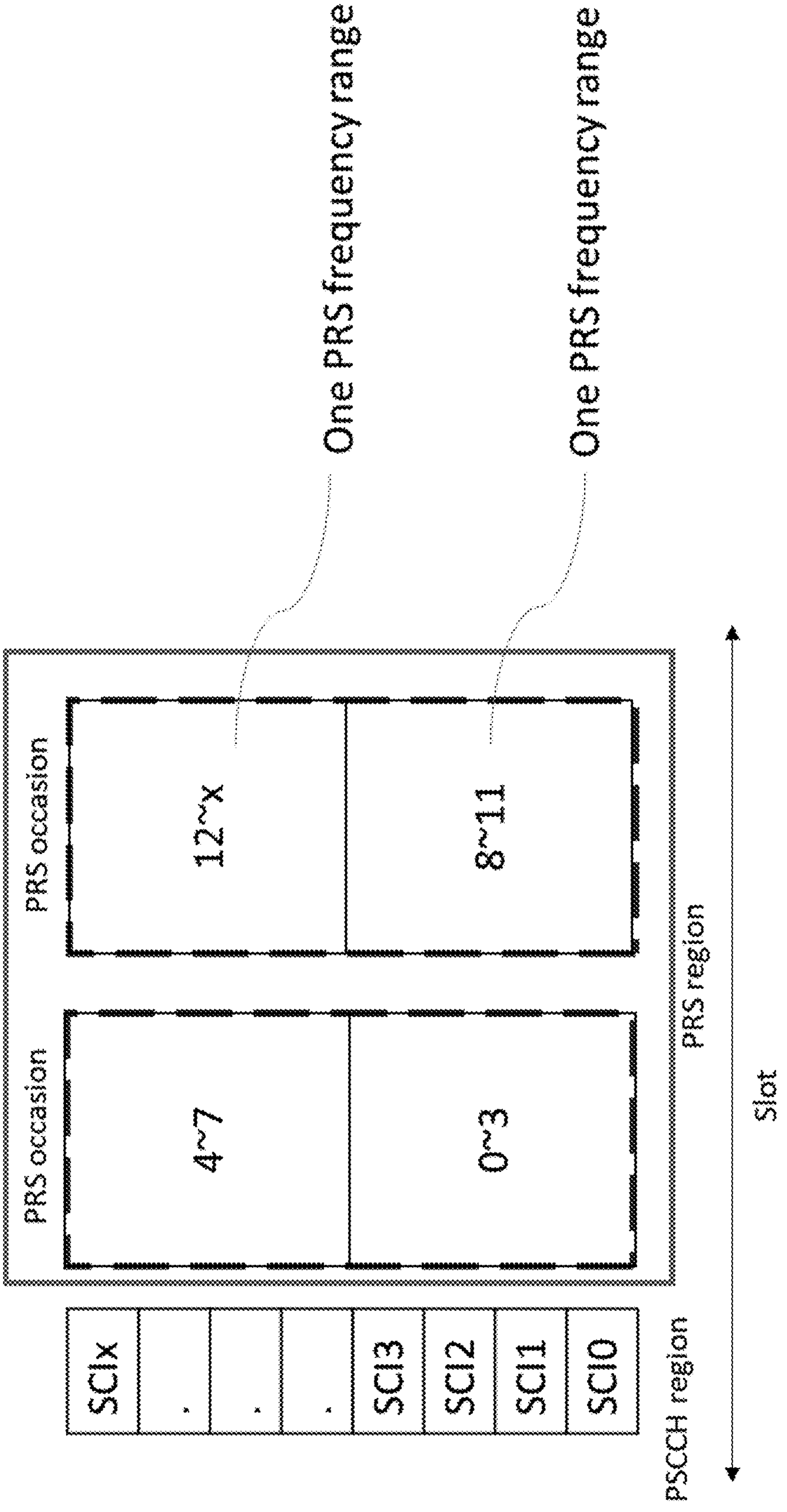
FIG. 10 is a diagram showing an implicit association (e.g., one-to-one association) between SCI0~SCIx (in a number of (x+1) sub-channels) to (x+1) SL-PRS resources, in accordance with embodiments of the present invention.

For example, as shown in FIG. 10, there are N=4 RE/comb offsets, X=2 SL-PRS occasions, and Y=2 PRS frequency ranges. In this example, implicit association (e.g., one-to-one association) between SCI0~SCIx (in a number of (x+1) sub-channels) to (x+1) SL-PRS resources. Each SL-PRS resource may be associated with an RE/comb offset, an SL-PRS occasion, a PRS frequency range. It could be illustrated that comb-N would be recycled in different PRS frequency ranges and/or PRS occasions. Preferably in certain embodiments, there may be or may not be Automatic Gain Control (AGC) symbols between the PRS region and the PSCCH region. Preferably in certain embodiments, index order could be illustrated in FIG. 10 (same PRS occasion first followed by next PRS occasion) or same PRS frequency range first followed by next PRS frequency range. Preferably in certain embodiments, SL-PRS with index 4~7 is associated with SR PRS resource with RE/comb offset 0~3. Preferably in certain embodiments, the (x+1) sub-channels for SCI0~SCIx may be contiguous or discontinuous (e.g., interleaved) in frequency domain.

Based on the measurement result of PSCCH in one sub-channel in the PSCCH region, the UE could determine whether this sub-channel is congested or not. When the UE determines one PSCCH resource is congested/occupied based on the measurement result of the one PSCCH resource (e.g., RSSI measurement is higher than a threshold), the UE may determine one associated SL-PRS resource is congested/occupied. When the UE determines one PSCCH resource is not congested/occupied based on the measurement result of the one PSCCH resource (e.g., RSSI measurement is lower than a threshold), the UE may determine one associated SL-PRS resource is not congested/occupied.

Even a scheduled/configured SL-PRS is within a wider-band or occupying a first number of sub-channels, the UE determines CBR and/or CR based on the measurement or the measurement result of PSCCH in the PSCCH region.

Preferably in certain embodiments, one PSCCH could occupy more than one sub-channel. Preferably in certain embodiments, the number of sub-channels for one PSCCH could be configured or specified or predefined. Preferably in certain embodiments, the measurement of PSCCH in one sub-channel may mean/comprise/interpret measurement of PSCCH in the more than one sub-channel. Preferably in certain embodiments, the UE could measure RSSI for each sub-channel in symbol(s) of the PSCCH region. Preferably in certain embodiments, the UE may average (received) signal strength in watts for the sub-channel in symbol(s) of the PSCCH region. Preferably in certain embodiments, the UE could measure RSSI for each of the more than one sub-channel utilized/occupied by PSCCH in symbol(s) of the PSCCH region. Preferably in certain embodiments, the UE may average (received) signal strength in watts for each of the more than one sub-channel utilized/occupied by PSCCH in symbol(s) of the PSCCH region. Preferably in certain embodiments, there is association between one sub-channel (or the more than one sub-channel) comprising PSCCH and one PRS resource. Preferably in certain embodiments, one PRS resource could be one PRS resource with an RE/comb offset (e.g., offset 1 for comb-N PRS structure).

Preferably in certain embodiments, one PSCCH could occupy a number of PRBs within one sub-channel. Preferably in certain embodiments, the number of PRBs for one PSCCH could be configured or specified or predefined. Preferably in certain embodiments, the measurement of PSCCH in one sub-channel may mean/comprise/interpret measurement of PSCCH in the number of PRBs within the one sub-channel. Preferably in certain embodiments, the UE could measure RSSI for each number of PRBs of each sub-channel in symbol(s) of the PSCCH region. Preferably in certain embodiments, the UE may average (received) signal strength in watts for the number of PRBs within one sub-channel in symbol(s) of the PSCCH region. Preferably in certain embodiments, the UE could measure RSSI for each number of PRBs within each sub-channel utilized/occupied by PSCCH in symbol(s) of the PSCCH region. Preferably in certain embodiments, the UE may average (received) signal strength in watts for the number of PRBs within one sub-channel utilized/occupied by PSCCH in symbol(s) of the PSCCH region.

Figure 7:
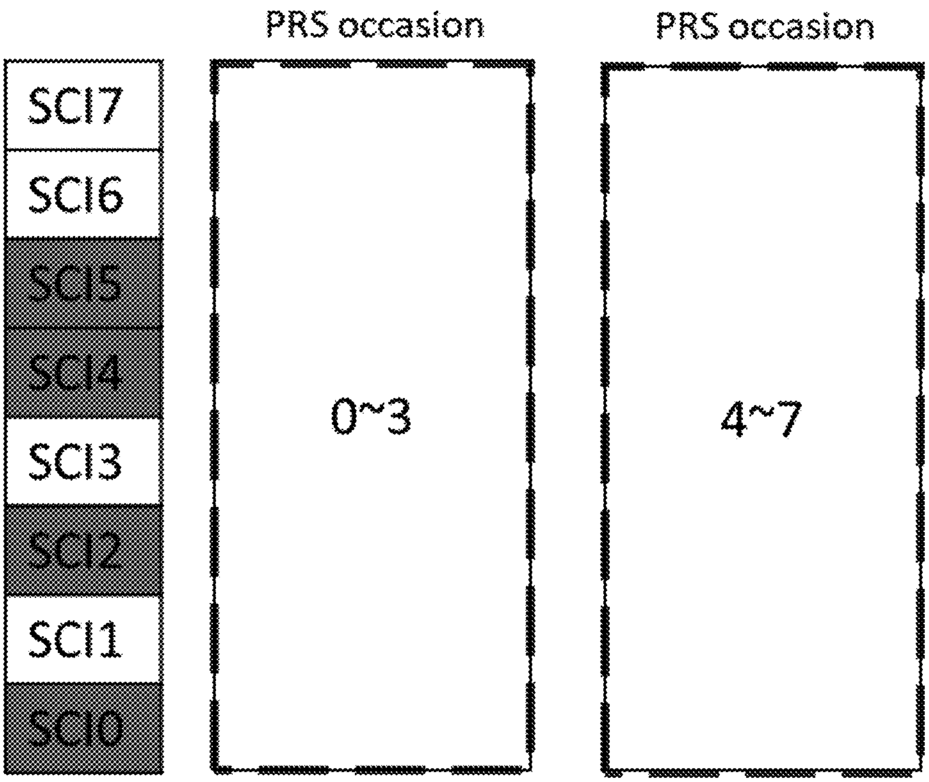
FIG. 7 is a diagram showing an implicit association between each PSCCH/sub-channel and one SL-PRS resource, in accordance with embodiments of the present invention.

There is implicit association between each PSCCH/sub-channel and one SL-PRS resource. For example, as shown in FIG. 7, SCI0 in the lowest sub-channel is associated with the SL-PRS pattern with RE/comb offset 0 and SCI1 in the second lowest sub-channel associated with SL-PRS pattern with RE/comb offset 1. In this example, there could be two PRS occasions in one slot. Alternatively, SL-PRS occasion for SL-PRS 4~7 is in a different slot (e.g., adjacent or consecutive sidelink slots) and/or cross slot scheduling SL-PRS by PSCCH in the previous slot is supported. Preferably in certain embodiments, the rationale is no matter how many sub-channels are occupied by SL-PRS and with which comb-N structure, there shall be one or more sub-channels for PSCCH to associate or schedule corresponding SL-PRS. Preferably in certain embodiments, it is more suitable to define RSSI, CR, CBR based on PSCCH (rather than based on SL-PRS).

For example, as shown in FIG. 7, the UE has detected SCI0, 2, 4, 5 (marked as gray) with respective SL-PRS transmissions from one or more other UEs. When the UE determines CBR among a time interval comprising TTI of FIG. 7, the UE would determine there are four sub-channels with SL RSSI being larger than a threshold. The UE does not determine CBR based on sub-channel in PRS region in TTI of FIG. 7. Assuming each TTI in the time interval has four sub-channels with PSCCH which SL RSSI is larger than a threshold, the UE could determine CBR as 0.5. No matter the SL-PRS transmitted via which SL-PRS index (e.g., 0, 1, 2, . . . , or 7), CBR determination is based on sub-channels and OFDM symbol(s) comprising PSCCH.

Preferably in certain embodiments, CBR determination is not based on sub-channel and OFDM symbol comprising SL-PRS.

Figure 8:
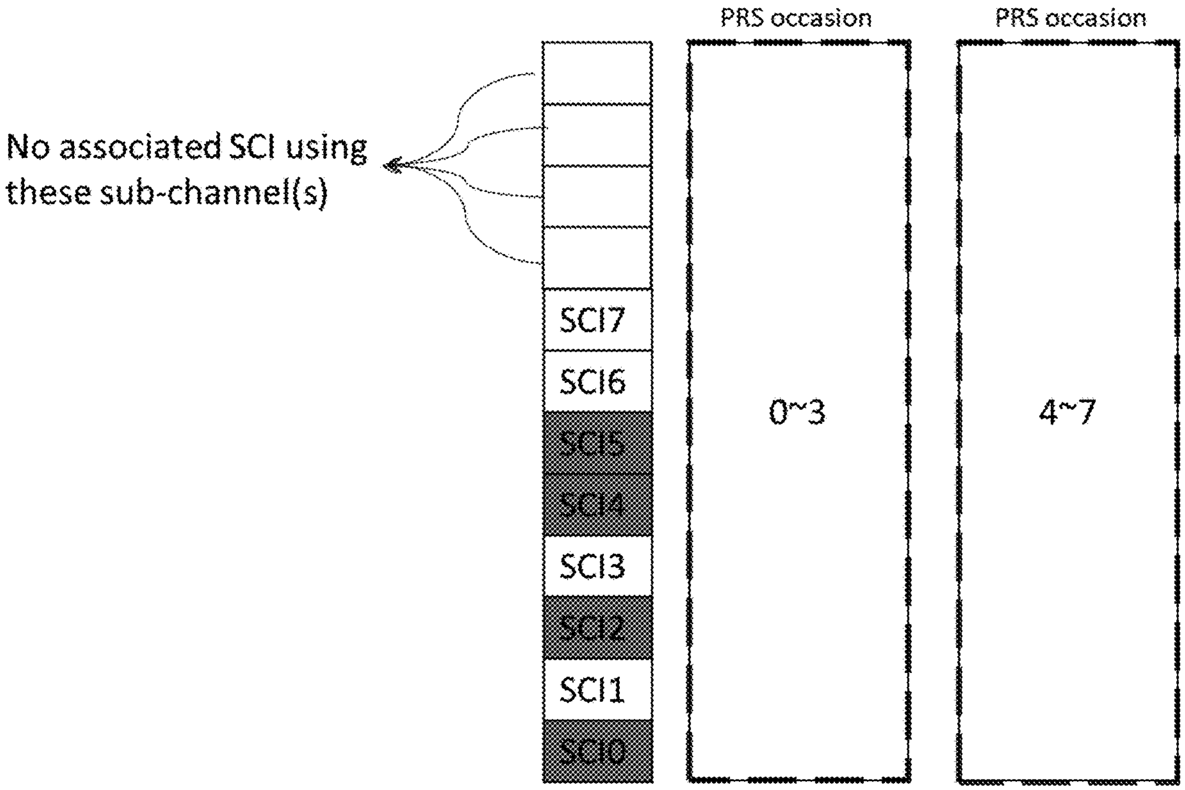
FIG. 8 is a diagram showing that there may be unused sub-channel(s) or PRB(s) in a sidelink resource pool while the PRS occasion may occupy whole sub-channels within a sidelink resource pool, in accordance with embodiments of the present invention.

For example, as shown in FIG. 8, there may be unused sub-channel(s) or PRB(s) in a sidelink resource pool while PRS occasion may occupy whole sub-channels within a sidelink resource pool. When determining CBR and/or CR, those sub-channel(s) or PRB(s) are not used for determining CBR and/or CR. More specifically, when determining CBR and/or CR, the sub-channel(s) or PRB(s) unused for (potential/candidate/possible) PSCCHs are not used for determining CBR and/or CR (for SL-PRS). More specifically, N·X·Y sub-channels in this example is 4*2*1 sub-channels which would be smaller than 12 sub-channels in a sidelink resource pool.

Figure 9:
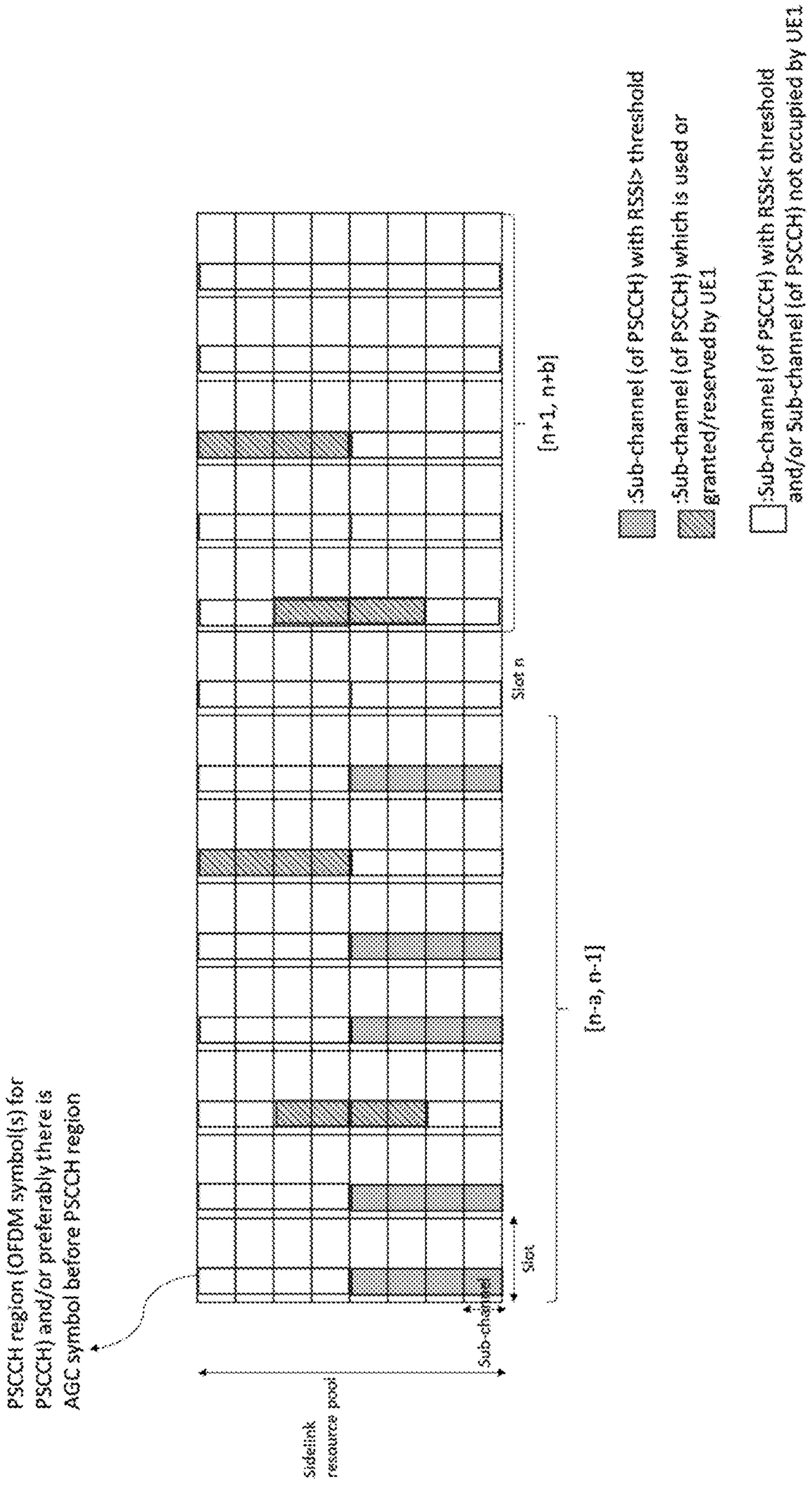
FIG. 9 is a diagram showing CR and CBR determination based on part of OFDM symbol(s) in each TTI and sub-channel in the PSCCH region, in accordance with embodiments of the present invention.

More specifically, as shown in FIG. 9, RSSI is measured in the PSCCH region only (rather than measured in SL-PRS region). FIG. 9 shows CR and CBR determination based on part of OFDM symbol(s) in each TTI and sub-channel in the PSCCH region. Assuming there are 8*7 sub-channels in a dedicated SL-PRS resource pool (RP) within interval [n−7, n−1] (7 is in one example of an illustration in FIG. 9) and based on RSSI measurement from sub-channel in PSCCH region, there are 4*5 sub-channels larger than an RSSI threshold. Preferably in certain embodiments, CBR could be determined based on the following formula.

$$CBR = \frac{\#\text{ number of sub-channels of a } SL\ PRS\ RP \text{ comprising } PSCCH \text{ which is with } RSSI \text{ larger than a } RSSI \text{ threshold}}{\#\text{ number of sub-channels of a } SL\ PRS\ RP \text{ comprising } PSCCH \text{ within } [n-a, n-1]},$$

or $$CBR = \frac{\#\text{ number of sub-channels of a } SL\ PRS\ RP \text{ which is with } RSSI \text{ larger than a } RSSI \text{ threshold}}{\#\text{number of sub-channels of a } SL\ PRS\ RP \text{ within } [n-a, n-1]},$$

In this example, CBR=20/56.

Preferably in certain embodiments, with respect to CR, measurement based on per-sub-channel comprising PSCCH is applied. Preferably in certain embodiments, as in the example of FIG. 9, assuming the UE has performed SL-PRS transmission using SL-PRS resource in slot n−5, slot n−2, and there are SL-PRS reservations by PSCCH of the UE in slot n+1 and slot n+3. More specifically, PSCCH in sub-channel #2 in slot n−5 could reserve sub-channel #2 in slot n+1. Preferably in certain embodiments, location of PSCCH in slot n−5 and location of PSCCH for scheduling SL-PRS in slot n+1 would have the same location. Preferably in certain embodiments, SL-PRS in slot n−5 and SL-PRS in slot n−1 would associate with the same RE/comb offset. Preferably in certain embodiments, assuming a=7 and b=5 for this example, assuming PSCCH associated with the UE's granted or used or reserved SL-PRS resource is associated with the same priority. Preferably in certain embodiments, in this example, the UE determines CR as 16/96. Preferably in certain embodiments, CR could be determined or calculated per priority. Preferably in certain embodiments, as in the example of FIG. 9, the UE may perform 4 PSCCH transmissions in slot n−5. Preferably in certain embodiments, the UE may perform associated 4 SL-PRS transmissions in slot n−5. Preferably in certain embodiments, the UE may perform the 4 SL-PRS transmissions separately in 4 SL-PRS occasions within slot n−5. It may mean/comprise that a UE is capable to perform at most one SL-PRS transmission in one SL-PRS occasion in one resource pool or one SL Bandwidth Part (BWP) or one carrier/cell. Alternatively, the UE may perform more than one SL-PRS transmission within one SL-PRS occasion. It may mean/comprise that a UE is capable to perform more than one SL-PRS transmission in one SL-PRS occasion in one resource pool or one SL BWP or one carrier/cell. Preferably in certain embodiments, the more than one SL-PRS transmission within one SL-PRS occasion may be separated in different frequency regions within one SL-PRS occasion. Preferably and/or alternatively, the more than one SL-PRS transmission within one SL-PRS occasion may be separated in different RE/comb offsets in the same frequency region within one SL-PRS occasion.

Concept 2

This concept is to determine RSSI, CBR, or CR value for SL-PRS transmission in a given TTI based on at least the measurement result of an SL-PRS region or an SL-PRS occasion. Preferably in certain embodiments, explicit or implicit methods to determine a number of SL-PRS resources is used. Preferably in certain embodiments, the explicit method could be based on the PSCCH decoding result for determining the number of SL-PRS resources being used. Preferably in certain embodiments, the implicit method could be based on (respective) sub-channels comprising PSCCH's measurement result. Preferably in certain embodiments, the UE determines RSSI, CBR, or CR value for SL-PRS transmission in a given TTI based on at least PSCCH's measurement result. More specifically, the UE could be based on how many sub-channels comprising PSCCH's measurement result (e.g., PSCCH, Reference Signal Received Power (RSRP), or RSSI) being larger than a threshold, determine a number of SL-PRS resources being scheduled. Preferably in certain embodiments, based on the number of SL-PRS resources being used, the measurement result of the SL-PRS region may be performed with a scaling. For example, as shown in FIG. 6, if only one SL-PRS (e.g., SL-PRS with RE/comb offset 0) is used, RSSI may be detected/measured over sub-channels and symbols in the PRS occasion. Based on some preprocessing from PSCCH (no matter explicit or implicit method), the UE would determine RSSI based on the measurement in the PRS occasion and a scaling factor. Preferably in certain embodiments, the scaling factor is associated with how many SL-PRSs are scheduled or used. Preferably in certain embodiments, the scaling factor is associated with a ratio of how many SL-PRS resources are being scheduled or used and how many (available/utilizable/possible) SL-PRS resources are over the measured sub-channels and symbols in the PRS occasion. In this example, the UE determines RSSI, CR, and/or CBR based on at least the scaling factor. Preferably in certain embodiments, the scaling factor is used to enlarge this nominal RSSI to actual RSSI.

Preferably in certain embodiments, an SCI could explicitly indicate which SL-PRS is used. Preferably in certain embodiments, the UE may determine RSSI, CBR, and/or CR based on a PSCCH decoding result. Preferably in certain embodiments, processing time may increase due to determining RSSI, CBR, and/or CR based on the PSCCH decoding result. Preferably in certain embodiments, there may be an additional time offset in addition to a current processing time or current time offset for CRB, CR determination based on sub-channel over (the measured) sub-channels and SL symbol(s) within a slot. Preferably in certain embodiments, a time offset could be a slot offset or a symbol offset. Preferably in certain embodiments, for comb-N structure, a different N value may correspond to a same or different additional time offset. Preferably in certain embodiments, in general, a larger comb-N with higher multiplexing capacity of SL-PRS may associate with a longer value of the additional time offset. Preferably in certain embodiments, on the other hand, smaller comb-N with a lower multiplexing capacity of SL-PRS may associate with a smaller value of the additional time offset. Preferably in certain embodiments, for example, comb-12, an additional time offset may be configured or specified or predefined as 2 slots. Preferably in certain embodiments, comb-2, an additional time offset may be configured or specified or predefined as 0 or 1 slot.

One example text proposal could be shown below (i.e., wording with bold and underline).

---

If a UE is configured with higher layer parameter sl-CR-Limit and transmits PSSCH in slot n, the UE shall ensure the following limits for any priority value k;

$$\sum_{i\geq k} CR(i) \leq CR_{Limit}(k)$$

where CR(i) is the CR evaluated in slot n-N for the PSSCH transmissions with 'Priority' field in the SCI set to i, and
$CR_{Limit}(k)$ corresponds to the high layer parameter sl-CR-Limit that is associated with the priority value k and the
CBR range which includes the CBR measured in slot n-N-<u>offset</u>, where N is the congestion control processing time,
<u>and offset is 0 for sidelink resource pool for PSSCH, offset is configured for sidelink resource pool for SL-PRS.</u>

---

One example text proposal could be shown below (i.e., wording with bold and underline). Preferably in certain embodiments, for a dedicated SL-PRS resource pool, the UE could be configured with another congestion control processing time (e.g., different processing time or current time offset for CRB, CR determination than current processing time or current time offset for CRB, CR determination). Alternatively, the another congestion control processing time may be configured as the same as current congestion control processing time. Preferably in certain embodiments, another congestion control processing time could be predefined or specified for a dedicated SL-PRS resource pool which may be different than the current congestion control processing time for sidelink resource pool other than the dedicated SL-PRS resource pool.

---

If a UE is configured with higher layer parameter sl-CR-Limit and transmits PSSCH in slot n, the UE shall ensure the following limits for any priority value k;

$$\sum_{i\geq k} CR(i) \leq CR_{Limit}(k)$$

where CR(i) is the CR evaluated in slot n-N for the PSSCH transmissions with 'Priority' field in the SCI set to i, and
$CR_{Limit}(k)$ corresponds to the high layer parameter sl-CR-Limit that is associated with the priority value k and the
CBR range which includes the CBR measured in slot n-N, where Nis the congestion control processing time <u>which is determined for sidelink resource pool for PSSCH, or for sidelink resource pool for SL-PRS, respectively/independently.</u>

---

Preferably and/or alternatively, congestion control processing time is respectively different for the sidelink resource pool comprising PSSCH with/without SL-PRS, and for the dedicated SL-PRS resource pool.

Preferably and/or alternatively, congestion control processing time is the same for the sidelink resource pool comprising SL-PRS and PSSCH, the dedicated SL-PRS resource pool, or the sidelink resource pool comprising PSSCH.

Concept 3

This concept is to determine RSSI, CR, and/or CBR based on one or more SL-PRS resources with respective RE/comb offset in one/each sub-channel. Preferably in certain embodiments, for each sub-channel, a UE could determine N·X RSSI. Preferably in certain embodiments, one SL-PRS region may comprise X SL-PRS occasions in time domain. Preferably in certain embodiments, X≥1. Preferably in certain embodiments, when X>1, different SL-PRS occasions are separated in different symbols. Preferably in certain embodiments, the UE could have capability to perform or determine RSSI based on the RE level resource. Preferably in certain embodiments, the UE performs or determines RSSI based on the RE level resource. Preferably in certain embodiments, for one RSSI associated with one SL-PRS resource in one sub-channel, the average of linear signal strength (in Watts) could be performed every N RE for the one SL-PRS resource in the one sub-channel. Preferably in certain embodiments, for one RSSI associated with one SL-PRS resource in one sub-channel, the average of linear signal strength (in Watts) is based on a number of REs associated with the one SL-PRS resource in the one sub-channel.

For determining CBR and/or CR, sub-channel is replaced by SL-PRS resource associated with an RE/comb offset. Preferably in certain embodiments, this concept is to be applied for dedicated SL-PRS RP. Preferably in certain embodiments, instead of using a sub-channel, using SL-PRS resources for deriving/determining/calculating CBR or CR could directly identify actual congestion situations for the SL-PRS resource in dedicated SL-PRS RP. Preferably in certain embodiments, a RSSI threshold for determining CBR could be configured (associated with PRS resource level). Preferably in certain embodiments, if there is no configuration of the RSSI threshold, a default set of parameters for determining CBR, CR could be associated with the SL-PRS resource.

Preferably and/or alternatively, this concept may be applied for shared/communication resource pools with PSSCH resources and SL-PRS resources. The UE may derive/determined/calculate CBR or CR for SL-PRS. The UE may derive/determined/calculate another CBR or another CR for PSSCH. Preferably in certain embodiments, instead of using sub-channel, using SL-PRS resource for deriving/determining/calculating CBR or CR for SL-PRS could directly identify actual congestion situation for SL-PRS resource in the shared/communication resource pool. Preferably in certain embodiments, the RSSI threshold for determining CBR for SL-PRS could be configured (associated with PRS resource level). Preferably in certain embodiments, if there is no configuration of the RSSI threshold, a default set of parameters for determining CBR, CR for SL-PRS could be associated with the SL-PRS resource. Preferably in certain embodiments, the CBR or CR for SL-PRS is utilized for determining/deriving whether or not the UE can perform SL-PRS with a SL-PRS priority and/or determining one or more parameters of SL-PRS transmission (e.g., power parameter, BW, comb-N, SL-PRS enabled/disable, . . . ). Preferably in certain embodiments, the another/other CBR or CR for PSSCH is utilized for determining/deriving whether or not the UE can perform PSSCH with a PSSCH priority and/or determining one or more parameters of PSSCH transmission (e.g., power parameter, BW, Modulation Coding Scheme (MCS), . . . ).

Preferably and/or alternatively, this concept may not be applied for shared/communication resource pools with PSSCH resources and SL-PRS resources. Preferably in certain embodiments, in a shared/communication resource pool, there may be no specific/dedicated CBR or CR for SL-PRS. Preferably in certain embodiments, for SL-PRS transmission in the shared/communication resource pool, the UE may not utilize another CBR or another CR for PSSCH. Alternatively, for SL-PRS transmission in the shared/communication resource pool, the UE may utilize another CBR or another CR for PSSCH. Preferably in certain embodiments, the another/other CBR or another/other CR for PSSCH is utilized for determining/deriving whether or not the UE can perform SL-PRS with a SL-PRS priority and/or determining one or more parameters of SL-PRS transmission (e.g., power parameter, BW, comb-N, SL-PRS enabled/disable, . . . ). Preferably in certain embodiments, the another/other CBR or CR for PSSCH is utilized for determining/deriving whether or not the UE can perform PSSCH with a PSSCH priority and/or determining one or more parameters of PSSCH transmission (e.g., power parameter, BW, MCS, . . . ). Preferably in certain embodiments, when the UE has/determines a PSSCH transmission and a SL-PRS transmission in the same slot, the UE may utilize/base on PSSCH priority for deriving/determining CR or checking the CR limit (i.e., not utilize/based on SL-PRS priority). Preferably in certain embodiments and/or alternatively, when the UE has/determines a PSSCH transmission and a SL-PRS transmission in the same slot, the UE may utilize/base on SL-PRS priority for deriving/determining CR or checking the CR limit (i.e., not utilize/base on PSSCH priority). Preferably and/or alternatively, when the UE has/determines a PSSCH transmission and a SL-PRS transmission in the same slot, the UE may utilize/base on a higher priority between PSSCH priority and SL-PRS priority (or a smaller priority value between PSSCH priority value and SL-PRS priority value) for deriving/determining CR or checking the CR limit. Preferably and/or alternatively, when the UE has/determines a PSSCH transmission and a SL-PRS transmission in the same slot, the UE may utilize/base on a lower priority between PSSCH priority and SL-PRS priority (or a larger priority value between PSSCH priority value and SL-PRS priority value) for deriving/determining CR or checking the CR limit.

Preferably in certain embodiments, CBR (for SL-PRS) could be determined based on the following formula.

$$CBR = \frac{\#\text{ how many } PRS \text{ resource, which is defined per offset and per sub-channel, } > RSSI \text{ within an time interval}}{\#\text{ how many } PRS \text{ resource, which is defined per offset and per sub-channel, within an time interval}}$$

Preferably in certain embodiments, CR (for SL-PRS) could be determined based on the following formula.

$$CR = \frac{\#\text{ how many PRS resource, which is defined per offset and per sub-channel, is granted or used by UE within a second time interval}}{\#\text{ how many PRS resource, which is defined per offset and per sub-channel, within a second interval}}$$

Alternatively and/or preferably, CBR (for SL-PRS) could be determined based on the following formula.

$$CBR = \frac{\#\text{ how many } PRS \text{ resource} > RSSI \text{ within an time interval}}{\#\text{ how many } PRS \text{ resource within an time interval}}$$

wherein PRS resource is defined per (RE) offset and per starting location with smallest BW of SL PRS, or alternatively PRS resource is defined per (RE) offset and per starting location with frequency granularity associated with SL PRS.

Alternatively and/or preferably, CR (for SL-PRS) could be determined based on following formula.

$$CR = \frac{\#\text{ how many PRS resource is granted or used by UE within a second time interval}}{\#\text{ how many PRS resource within a second interval}}$$

wherein PRS resource is defined per (RE) off set and per starting location with smallest BW of SL PRS, or alternatively PRS resource is defined per (RE) offset and per starting location with frequency granularity associated with SL PRS.

Figure 11:
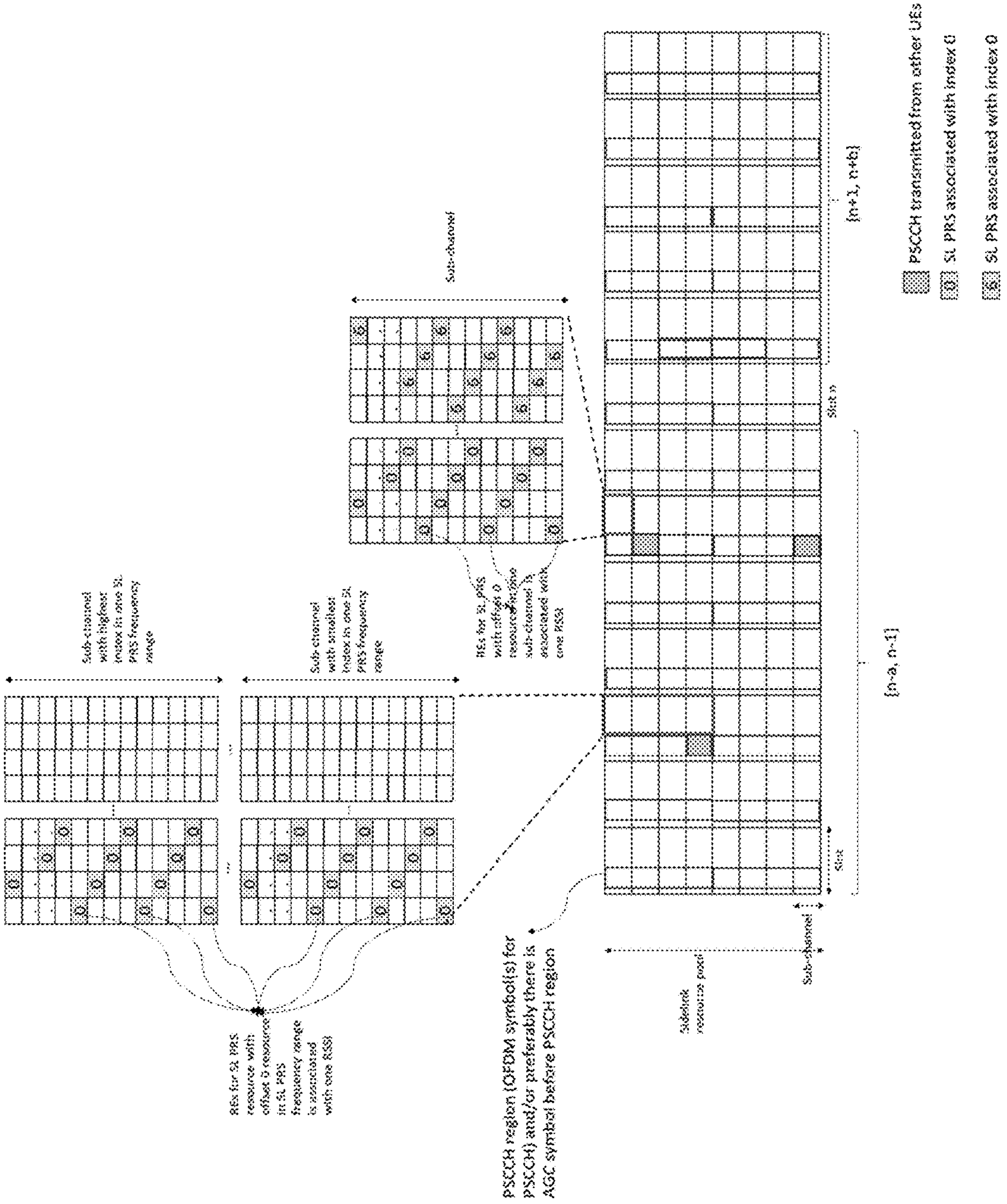
FIG. 11 is a diagram wherein there are comb-4 SL-PRS structures in one PRS occasion, and there are two SL-PRS occasions in one TTI, in accordance with embodiments of the present invention.

For example, as shown in FIG. 11, assuming there are comb-4 SL-PRS structures in one PRS occasion, and there are two SL-PRS occasions in one TTI. Taking slot n−2 as an example, the UE would have 8 RSSI results for respective 8 SL-PRS resources in one sub-channel or over occupied sub-channel(s) in one SL-PRS occasion. In this example, the UE determines RSSI associated with RE/comb offset 0 would be larger than an RSSI threshold and an RSSI associated with RE/comb offset 6 would be larger than an RSSI threshold. In this example, implicit association between PSCCH and SL-PRS would be determined. Without decoding PSCCH or without having an SCI result, the UE could perform measurement for each SL-PRS resource (for each occupied sub-channel).

Alternatively and/or preferably, granularity of sub-channels could be grouped into larger granularity such as SL-PRS frequency range. Alternatively and/or preferably, resources for SL-PRS within the sidelink resource pool could be grouped into larger granularity such as a group of sub-channels. Preferably in certain embodiments, the intention is to reduce complexity of using sub-channels with increasing N·X RSSI results. Preferably in certain embodiments, without losing generality, there is a smallest/basis granularity for SL-PRS transmission in frequency domain, and/or the UE would determine one or more RSSIs based on the smallest/basis granularity for SL-PRS transmission. Preferably in certain embodiments, the smallest/basis granularity for SL-PRS transmission in frequency domain is not one sub-channel. Preferably in certain embodiments, the smallest/basis granularity for SL-PRS transmission in frequency domain may be the same or a different indifferent Resource Pool (RP). Preferably in certain embodiments, the smallest/basis granularity for SL-PRS transmission in frequency domain is the group of sub-channels or a set of PRBs. Preferably in certain embodiments, each RP for SL-PRS could be configured or preconfigured with smallest/basis granularity for SL-PRS transmission in frequency domain. Alternatively, granularity in dedicated SL-PRS RP for SL-PRS is larger than granularity in the same RP for PSCCH. For example, there are a first granularity for PSCCH in one RP while a second granularity for SL-PRS in the one same RP. Preferably in certain embodiments, the second granularity is larger than the first granularity. Preferably in certain embodiments, the second granularity is a multiple integer of the first granularity. Preferably in certain embodiments, the UE determines one or more RSSIs for one second granularity for SL-PRS transmission (in an RP). Preferably in certain embodiments, the UE determines one or more RSSIs for the smallest/basis granularity for SL-PRS transmission (in an RP). Preferably in certain embodiments, the UE determines CR and/or CBR (for SL-PRS) based on the smallest/basis granularity for SL-PRS transmission (in an RP). Preferably in certain embodiments, the UE determines CR and/or CBR (for SL-PRS) based on the second granularity for SL-PRS transmission (in an RP). Preferably in certain embodiments, based on the second granularity for SL-PRS transmission in frequency domain and one or more (candidate) starting location(s) for SL-PRS, the UE could determine CR and/or CBR (in an RP). For example, as shown in FIG. 10, assuming comb-4 structure for SL-PRS transmission and second granularity or the smallest/basis granularity for SL-PRS transmission is in one PRS frequency range and there are two PRS frequency ranges. Preferably in certain embodiments, the UE could determine 4 RSSIs for one PRS frequency range in one SL-PRS occasion. Preferably in certain embodiments, for the RSSI associated with SL-PRS with RE/comb offset 0, the UE would perform an average of the signal strength (in Watts) over REs of SL-PRS with RE/comb offset 0 in one PRS frequency range (in one SL-PRS occasion). Preferably in certain embodiments, there is no need to perform an average of signal strength (in Watts) over REs of SL-PRS with RE/comb offset 0 for each sub-channel. Preferably in certain embodiments, in this example, the smallest/basis granularity or the second granularity for SL-PRS transmission in the one SL-PRS frequency range. Preferably in certain embodiments, different SL-PRS frequency ranges do not overlap in frequency domain. Preferably in certain embodiments, when zooming out to FIG. 11, CR/CBR determination may be based on total SL-PRS resources with the smallest/basis granularity or the second granularity for SL-PRS transmission. Preferably in certain embodiments, taking slot n−5 as an example, 4 sub-channels could be smallest/granularity for SL-PRS transmission. Preferably in certain embodiments, each TTI/slot comprises Y=2 SL-PRS frequency range, where each is associated with one second granularity for SL-PRS transmission. Preferably in certain embodiments, assuming one slot corresponds to the PRS region as illustrated in FIG. 10, the UE would determine N·X·Y RSSI in the one slot. Preferably in certain embodiments, N·X·Y RSSI in the one slot corresponds to N·X·Y SL-PRS resources, respectively. For CBR, within interval [n−a, n−1], there are a*N·X·Y SL-PRS resources for SL-PRS transmission. For CR, within interval [n−a, n−1] and [n+1,n+b], there are (a+b)*N·X·Y SL-PRS resources for SL-PRS transmission.

Preferably in certain embodiments, an interval between consecutive two specific (candidate) starting sub-channels or locations for SL-PRS transmission could have more granularity. Preferably in certain embodiments, based on the interval between consecutive two specific (candidate) starting sub-channels or locations for SL-PRS transmission, granularity for SL-PRS could be determined. For example, as shown in FIG. 10, assuming there are (x+1) sub-channels in an RP, and (candidate) starting location is sub-channel 0, (x+1)/2 with/without ceiling/floor function. The interval between sub-channel 0 and (x+1)/2 could be granularity for SL-PRS transmission. Assuming x=7, two (candidate) starting locations could be sub-channel 0 and 4. Based on two consecutive (candidate) starting locations of SL-PRS and/or ending sub-channel of the sidelink resource pool, the PRS frequency range could be determined. Preferably in certain embodiments, BW of the PRS frequency range could be granularity for SL-PRS transmission. Preferably in certain embodiments, the size of BW of PRS frequency range could be the same or different between a different PRS frequency range. Preferably in certain embodiments, a size or BW of PRS frequency range may be determined based on at least the starting location for SL-PRS in the sidelink resource pool. Alternatively, PRS frequency ranges may be determined based on granularity configured for SL-PRS and/or one or more specific (candidate) starting locations. Preferably in certain embodiments, two consecutive PRS frequency ranges may or may not overlap in frequency domain with each other. Preferably in certain embodiments, it may depend on (candidate) the starting location and/or granularity for SL-PRS. Preferably in certain embodiments, the interval of two consecutive (candidate) starting locations for SL-PRS is larger than or equal to granularity for SL-PRS.

Preferably in certain embodiments, there are specific (candidate) starting sub-channels or locations for SL-PRS transmission. Preferably in certain embodiments, the UE could be configured with one or more (candidate) starting sub-channels or one or more (candidate) starting locations. Preferably in certain embodiments, such configuration of a specific (candidate) starting sub-channel or location could be provided per resource pool or per PC5 RRC signaling or per SL BWP. Preferably in certain embodiments, the UE cannot perform SL-PRS transmission on SL-PRS resource starting other than such specific (candidate) starting sub-channel or location. Preferably in certain embodiments, for a pool configured with K sub-channels which is indexed as 0~K−1, the UE could be configured with a specific (candidate) starting sub-channel as 0, Z, 2Z. Preferably in certain embodiments, Z could depend on how many PRS frequency ranges are in the sidelink resource pool. For example, if there are 2 PRS frequency ranges in a resource pool, the candidate (candidate) starting position could be the starting (candidate) sub-channel associated with the 2 PRS frequency ranges. Preferably in certain embodiments, BW or size of each PRS frequency range is used as (frequency) granularity for SL-PRS. In other words, the SL-PRS resource is defined as per RE/comb offset spreading at least in one or more PRS frequency ranges. Preferably in certain embodiments, when transmitting SL-PRS using more than one PRS frequency range, the same RE/comb offset of SL-PRS resources in different PRS frequency ranges shall be guaranteed and selected or determined. Alternatively, when transmitting SL-PRS using more than one PRS frequency range, a different RE/comb offset of the SL-PRS resources in different PRS frequency ranges could be guaranteed and selected or determined. Preferably in certain embodiments, SL-PRS transmission cannot be performed merely in a subset/part of PRBs or sub-channels within the SL-PRS frequency range. Preferably in certain embodiments, size/BW of the PRS frequency ranges in the resource pool is the same.

Preferably in certain embodiments, the specific (candidate) starting sub-channel or location for SL-PRS could be provided by a bit-map. Preferably in certain embodiments, each bit would associate with one sub-channel or a frequency unit or a PRB or the first granularity for PSCCH.

Preferably in certain embodiments, granularity/BW of SL-PRS and/or one or more specific (candidate) starting frequency locations could be used to determine one or more PRS frequency ranges. Alternatively, PRS frequency ranges could be used to determine granularity/BW of SL-PRS and one or more specific (candidate) starting frequency locations. Preferably in certain embodiments, the UE could be provided with one or more PRS frequency ranges. Preferably in certain embodiments, the UE could be provided with granularity for SL-PRS (which is a pool-specific configuration). Preferably in certain embodiments, the UE could be provided with one or more specific (candidate) starting frequency locations for SL-PRS transmission (which is a pool-specific configuration). Preferably in certain embodiments, the UE is not allowed or does not transmit SL-PRS (with starting location) other than the one or more specific (candidate) starting frequency locations (if the UE determines to transmit SL-PRS in the dedicated SL-PRS RP). Preferably in certain embodiments, PRS frequency ranges could be determined based on one or more specific (candidate) starting frequency locations. Preferably in certain embodiments, granularity/BW of SL-PRS could be determined based on two consecutive/adjacent (candidate) starting frequency locations. Alternatively and/or preferably in certain embodiments, the UE could be provided with one lowest/initial starting frequency location (which is a pool-specific configuration). Preferably in certain embodiments, the UE could be provided with granularity/BW of SL-PRS (which is a pool-specific configuration). Preferably in certain embodiments, based on granularity/BW of SL-PRS and the lowest/initial starting frequency location, PRS frequency ranges could be determined. Preferably in certain embodiments, based on granularity/BW of SL-PRS and the lowest/initial starting frequency location, one or more specific (candidate) starting frequency locations for transmitting PRS is determined. For example, the lowest/initial starting frequency location is sub-channel #t, and granularity/BW of SL-PRS is Z, then one or more specific (candidate) starting frequency locations could be sub-channel t, t+Z, t+2Z . . . . Preferably in certain embodiments, SL-PRS resources (separation/distribution/multiplexing) using one or more (candidate) starting frequency locations shall ensure SL-PRS transmission does not exceed the last sub-channel in an SL RP. In other words, $t+iZ-1\leq$ last sub-channel index. Preferably in certain embodiments, a number of sub-channels in a sidelink resource pool for SL-PRS is multiple integer numbers of BW/granularity of SL-PRS. For example, when a pool is configured for SL-PRS and with K sub-channels, (the number of sub-channels of) BW/granularity of SL-PRS is restricted or limited to be divisible by K.

Preferably in certain embodiments, granularity/BW of SL-PRS is based on supported positioning/ranging requirement of SL-PRS in the sidelink resource pool. For example, if an SL RP supports a positioning requirement associated with 5 MHz, 10 MHz of BW for SL-PRS, granularity/BW for SL-PRS is Z sub-channels associated with around 5 MHz (the lowest one or the most relaxed/positioning/ranging requirement). Preferably in certain embodiments, if there is a need to transmit SL-PRS with around 10 MHz, 2 Z sub-channels are used or determined to perform SL-PRS transmission.

One text proposal is proposed below (i.e., wording with bold and underline).

| 5.1.27 Sidelink channel busy ratio (SL CBR) | |
|---|---|
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n − a, n − 1], wherein a is equal to 100 or 100 · $2^{\mu}$ slots, according to higher layer parameter sl-TimeWindowSizeCBR.<br>**For dedicated SL-PRS RP, SL Channel Busy Ratio (SL CBR) measured in slot n is defined as the portion of SL-PRS resources in the resource pool whose SL RSSI measured by the UE exceed a (pre-)configured threshold sensed over a CBR measurement window [n − a, n − 1], wherein a is equal to 100 or 100 · $2^{\mu}$ slots, according to higher layer parameter sl-TimeWindowSizeCBR.**<br>**Alt1: SL-PRS resource corresponds to resource associated with one RE/comb offset and starts in specific starting position and BW of the SL-PRS is associated with granularity configured for SL-PRS.**<br>**Alt2: SL-PRS resource corresponds to resource associated with one RE/comb offset and starts in specific starting position and BW of the SL-PRS is associated with BW of SL-PRS frequency range.**<br>**Alt3: SL-PRS resource corresponds to resource associated with one RE/comb offset in one sub-channel.**<br>When UE is configured to perform partial sensing by higher layers (including when SL DRX is configured), SL RSSI is measured in slots where the UE performs partial sensing and where the UE performs PSCCH/PSSCH reception within the CBR measurement window. The calculation of SL CBR is limited within the slots for which the SL RSSI is measured. If the number of SL RSSI measurement slots within the CBR measurement window is below a (pre-)configured threshold, a (pre-)configured SL CBR value is used. |
| Applicable for | RRC_IDLE intra-frequency,<br>RRC_IDLE inter-frequency,<br>RRC_CONNECTED intra-frequency,<br>RRC_CONNECTED inter-frequency |

One text proposal is proposed below (i.e., wording with bold and underline).

| 5.1.26 Sidelink channel occupancy ratio (SL CR) | |
|---|---|
| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b].<br>**For dedicated SL-PRS RP, Sidelink Channel Occupancy Ratio (SL CR) evaluated at slot n is defined as the total number of SL-PRS resource used for its transmissions in slots [n − a, n − 1] and granted in slots [n, n + b] divided by the total number of configured SL-PRS resource in the transmission pool over [n − a, n + b],**<br>**Alt1: SL-PRS resource corresponds to resource associated with one RE/comb offset and starts in specific starting position and BW of the SL-PRS is associated with granularity configured for SL-PRS.**<br>**Alt2: SL-PRS resource corresponds to resource associated with one RE/comb offset and starts in specific starting position and BW of the SL-PRS is associated with BW of SL-PRS frequency range.**<br>**Alt3: SL-PRS resource corresponds to resource associated with one RE/comb offset in one sub-channel.** |
| Applicable for | RRC_IDLE intra-frequency,<br>RRC_IDLE inter-frequency,<br>RRC_CONNECTED intra-frequency,<br>RRC_CONNECTED inter-frequency |

| 5.1.25 Sidelink received signal strength indicator (SL RSSI) | |
|---|---|
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the $2^{nd}$ OFDM symbol.<br>**For dedicated SL-PRS RP, Sidelink ReceivedSignal Strength Indicator (SL RSSI) is defined as the linear average of the total received power (in [W]) observed in the configured SL-PRS resource in OFDM symbols of a slot (or preferably a PRS occasion) configured for SL-PRS and configured sub-channel in OFDM symbols of a slot configured for PSCCH.**<br>**Alt1: SL-PRS resource corresponds to resource associated with one RE/comb offset and starts in specific starting position and BW of the SL-PRS is associated with granularity configured for SL-PRS.**<br>**Alt2: SL-PRS resource corresponds to resource associated with one RE/comb offset and starts in specific starting position and BW of the SL-PRS is associated with BW of SL-PRS frequency range.**<br>**Alt3: SL-PRS resource corresponds to resource associated with one RE/comb offset in one sub-channel.**<br>For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |

Any combination of the above concepts or teachings can be jointly combined or formed to a new embodiment. The disclosed details and embodiments can be used to solve at least (but not limited to) the issues mentioned above and herein.

Preferably in certain embodiments, any or any combination of above concept(s) are used for comb-N structure for SL-PRS. Preferably in certain embodiments, for SL RP supporting comb-N for SL-PRS, CR/CBR/RSSI is determined based on the above concept(s). More specifically, N=1, then CR/CBR/RSSI for PSCCH and PSSCH could be used. Preferably in certain embodiments, no matter whether there is comb-N structure for SL-PRS in a SL RP for PSSCH and SL-PRS, CR/CBR/RSSI for PSCCH and PSSCH could be used (which is not based on any or any combination of above concept(s)).

Preferably in certain embodiments, with RSSI, CBR, CR determined for SL-PRS, congestion control for SL-PRS could be performed and supported.

Preferably in certain embodiments, one symbol between the SCI/PSCCH occasion and (next/closest/following) the SL-PRS occasion may be utilized for AGC. Alternatively, there may be no AGC symbol between the SCI/PSCCH occasion and the (next/closest/following) SL-PRS occasion.

Preferably in certain embodiments, one symbol between two (adjacent/neighboring) SL-PRS occasions may be utilized for AGC. Preferably in certain embodiments, two symbols between two (adjacent/neighboring) SL-PRS occasions may be utilized for Gap/TX-RX_Switch and AGC (respectively). Alternatively, there may be no AGC/Gap/TX-RX_Switch symbol between two (adjacent/neighboring) SL-PRS occasions.

Preferably in certain embodiments, the first/initial symbol of one slot or one scheduling/allocation time unit may be utilized for AGC. Preferably in certain embodiments, the last symbol of one slot or one scheduling/allocation time unit may be utilized as a gap symbol for possible TX-RX switch.

Preferably in certain embodiments, figures in the present application are just example instances. Distribution of AGC, SCI/PSCCH, SL-PRS, Gap, TX-RX switch may be different, depending on future designs and/or resource pool configurations.

Preferably in certain embodiments, the SCI/PSCCH associated with SL-PRS may include/comprise information for scheduling/indicating/allocating SL-PRS resource. Preferably in certain embodiments, the SCI/PSCCH in the resource pool for SL-PRS may not comprise information for PSSCH/PSFCH. Preferably in certain embodiments, the SCI/PSCCH in the resource pool for SL-PRS may be different from another SCI/PSCCH in a resource pool with sidelink communication (i.e., PSSCH and/or PSFCH). Preferably in certain embodiments, the SCI/PSCCH associated with SL-PRS may be different from another/other SCI/PSCCH associated with PSSCH and/or PSFCH.

Preferably in certain embodiments, sidelink control information for PSSCH may be transmitted/delivered via 1st stage SCI and 2nd stage SCI. Preferably in certain embodiments, the sidelink control information for PSSCH may be delivered at least in PSCCH. Preferably in certain embodiments, the sidelink control information for PSSCH may comprise 1st stage SCI. Preferably in certain embodiments, the 1st stage SCI may be transmitted via PSCCH. Preferably in certain embodiments, the sidelink control information for PSSCH may comprise 2nd stage SCI. Preferably in certain embodiments, the 2nd stage SCI may be transmitted via multiplexed/multiplexing with PSSCH. Preferably in certain embodiments, the SCI format 1 or SCI format 1-X is 1st stage SCI. Preferably in certain embodiments, the SCI format 2-A or 2-B or 2-C or 2-X is a 2nd stage SCI.

Preferably in certain embodiments, for transmitting PSSCH in a slot or subslot, the TX UE needs to transmit SCI in the slot or the subslot for scheduling the PSSCH.

Preferably in certain embodiments, the resource pool for SL-PRS may be a dedicated resource pool for SL-PRS. Preferably in certain embodiments, the resource pool for SL-PRS may be a dedicated resource pool for sidelink reference signal and/or sidelink control information.

Preferably in certain embodiments, the resource pool for SL-PRS may not be a resource pool with sidelink communication (i.e., PSCCH/PSSCH and/or PSFCH). Alternatively, the resource pool for SL-PRS may be a shared resource pool with sidelink communication. The resource pool for SL-PRS may comprise PSSCH and/or PSFCH resources.

Preferably in certain embodiments, the SL-PRS may be applied/utilized for (absolute and/or relative) positioning and/or ranging.

Preferably in certain embodiments, the SL-PRS may be applied/utilized for any of time-based positioning/ranging methods and/or angle-based positioning/ranging methods. Preferably in certain embodiments, the SL-PRS may be applied/utilized for any of TDoA, Round-Trip Time (RTT)-based positioning/ranging, AoA, AoD, or carrier phase measurement based positioning.

Preferably in certain embodiments, any of the above methods, alternatives, and embodiments for SL-PRS may be applied for other reference signals (e.g., reference signals designed/introduced in future 5G or 6G or etc.).

Preferably in certain embodiments, any of the above methods, alternatives, and embodiments for SL-PRS may be applied for SL CSI-RS (for beam management).

Preferably in certain embodiments, any of the above methods, alternatives, and embodiments for SL-PRS may be applied for reference signals for (High-Resolution) localization (e.g., reference signals designed/introduced in future 5G or 6G or etc.).

Preferably in certain embodiments, any of the above methods, alternatives, and embodiments for SL-PRS may be applied for reference signals for (High-Resolution) sensing (e.g., reference signals designed/introduced in future 5G or 6G or etc.).

Preferably in certain embodiments, any of the above methods, alternatives, and embodiments for SL-PRS may be applied for reference signals for (High-resolution) imaging (e.g., reference signals designed/introduced in future 5G or 6G or etc.).

Preferably in certain embodiments, the slot may mean a sidelink slot. Preferably in certain embodiments, the slot may be represented/replaced as a TTI.

Preferably in certain embodiments, the sidelink slot may mean slot for sidelink. Preferably in certain embodiments, a TTI may be a subframe (for sidelink) or a slot (for sidelink) or a sub-slot (for sidelink). Preferably in certain embodiments, a TTI comprises multiple symbols, e.g., 12 or 14 symbols. Preferably in certain embodiments, a TTI may be a slot (fully/partially) comprising sidelink symbols. Preferably in certain embodiments, a TTI may mean a transmission time interval for a sidelink (data) transmission. Preferably in certain embodiments, a sidelink slot or a slot for sidelink may contain all OFDM symbols available for sidelink transmission. Preferably in certain embodiments, a sidelink slot or a slot for sidelink may contain a consecutive number of symbols available for sidelink transmission. Preferably in certain embodiments, a sidelink slot or a slot for sidelink means that a slot is included/comprised in a sidelink resource pool.

Preferably in certain embodiments, the symbol may mean a symbol indicated/configured for sidelink.

Preferably in certain embodiments, the slot may mean/comprise a sidelink slot associated with the (sidelink) resource pool. Preferably in certain embodiments, the slot may not mean/comprise a sidelink slot associated with another/other (sidelink) resource pool.

Preferably in certain embodiments, the contiguous/consecutive slots may mean contiguous sidelink slots in/for the (sidelink) resource pool.

Preferably in certain embodiments, the contiguous/consecutive slots may or may not be contiguous/consecutive in physical slots. This means that the contiguous/consecutive slots in the sidelink resource pool may be not contiguous/consecutive from the aspect of a physical slot. Preferably in certain embodiments, the contiguous/consecutive slots may or may not be contiguous/consecutive in sidelink slots in/for a sidelink BWP or a sidelink carrier/cell. This means that the contiguous/consecutive slots in the (sidelink) resource pool may be not contiguous/consecutive from the aspect of sidelink slots in a sidelink BWP or a sidelink carrier/cell. Preferably in certain embodiments, there may be one or more (sidelink) resource pools in a sidelink BWP or a sidelink carrier/cell.

Preferably in certain embodiments, a sub-channel is a unit for sidelink resource allocation/scheduling (for PSSCH). Preferably in certain embodiments, a sub-channel may comprise multiple contiguous PRBs in frequency domain. Preferably in certain embodiments, the number of PRBs for each sub-channel may be (pre-)configured for a sidelink resource pool. Preferably in certain embodiments, a sidelink resource pool (pre-)configuration may indicate/configure the number of PRBs for each sub-channel. Preferably in certain embodiments, the number of PRBs for each sub-channel may be any of 10, 12, 15, 20, 25, 50, 75, 100. Preferably in certain embodiments, a sub-channel may be represented as a unit for sidelink resource allocation/scheduling. Preferably in certain embodiments, a sub-channel may mean a set of consecutive PRBs in frequency domain. Preferably in certain embodiments, a sub-channel may mean a set of consecutive resource elements in frequency domain.

Preferably in certain embodiments, the sidelink transmission/reception may be UE-to-UE transmission/reception. Preferably in certain embodiments, the sidelink transmission/reception may be device-to-device transmission/reception. Preferably in certain embodiments, the sidelink transmission/reception may be Vehicle-to-Everything (V2X) transmission/reception. Preferably in certain embodiments, the sidelink transmission/reception may be Pedestrian-to-Everything (P2X) transmission/reception. Preferably in certain embodiments, the sidelink transmission/reception may be on PC5 interface.

Preferably in certain embodiments, the PC5 interface may be a wireless interface for communication between a UE and a UE or between a device and a device. Preferably in certain embodiments, the PC5 interface may be a wireless interface for communication between UEs or between devices. Preferably in certain embodiments, the PC5 interface may be a wireless interface for V2X or P2X communication. Preferably in certain embodiments, the Uu interface may be a wireless interface for communication between a network node and a device. Preferably in certain embodiments, the Uu interface may be a wireless interface for communication between a network node and a UE.

Preferably in certain embodiments, the TX UE may be/mean/comprise/replace a first device. Preferably in certain embodiments, the TX UE may be a vehicle UE. Preferably in certain embodiments, the TX UE may be a V2X UE. Preferably in certain embodiments, the TX UE may be a (UE-type) Roadside Unit (RSU).

Preferably in certain embodiments, the RX UE may be a second device. Preferably in certain embodiments, the RX UE may be a vehicle UE. Preferably in certain embodiments, the RX device may be a V2X UE. Preferably in certain embodiments, the RX UE may be an (UE-type) RSU.

Preferably in certain embodiments, the TX UE and the RX UE are different devices.

Preferably in certain embodiments, frequency offset could be replaced by comb-offset (e.g., 0~N−1).

Figure 12:
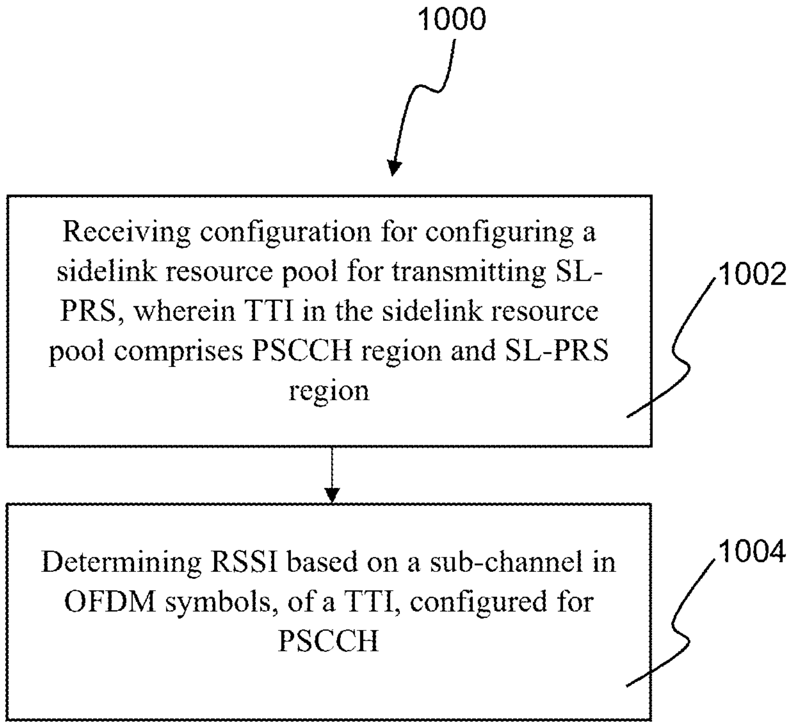
FIG. 12 is a flow diagram of a method of a first device comprising receiving configuration for configuring a sidelink resource pool for transmitting SL-PRS, and determining RSSI based on a sub-channel in OFDM symbols, in accordance with embodiments of the present invention.

Referring to FIG. 12, with this and other concepts, systems, and methods of the present invention, a method 1000 for a first device performing sidelink reference signal transmission in a wireless communication system comprises receiving configuration for configuring a sidelink resource pool for transmitting SL-PRS, wherein TTI in the sidelink resource pool comprises PSCCH region and SL-PRS region (step 1002), and determining RSSI based on sub-channel in OFDM symbols, of a TTI, configured for PSCCH (step 1004).

Preferably in certain embodiments, the PSCCH region and the SL-PRS region are separated in different symbols in the TTI, and/or the PSCCH region in the TTI comprises OFDM symbols, of a TTI, configured for PSCCH, and/or the SL-PRS region in the TTI comprises OFDM symbols, of a TTI, configured for SL-PRS.

Preferably in certain embodiments, the first device determines CR based on a number of sub-channels within a first interval.

Preferably in certain embodiments, the first device determines CBR based on a number of sub-channels within a second interval.

Preferably in certain embodiments, the first device determines CR NOT based on a sub-channel where SL-PRS resources occupies.

Preferably in certain embodiments, the first device determines CBR NOT based on a sub-channel where SL-PRS resource occupies.

Preferably in certain embodiments, the first device determines CR based on a sub-channel where PSCCH occupies.

Preferably in certain embodiments, the first device determines CBR based on a sub-channel where PSCCH occupies.

Preferably in certain embodiments, the sidelink resource pool comprises a specific number of sub-channels in the PSCCH region or the specific number of sub-channels in the PSCCH region does not associate with one SL-PRS resource.

Preferably in certain embodiments, when the first device determines CBR and/or CR based on sub-a channel over the PSCCH region, the first device does not count or take into account or apply the specific number of sub-channels in the PSCCH region.

Preferably in certain embodiments, the specific number of sub-channels in the SL-PRS region could be used for transmitting SL-PRS.

Preferably in certain embodiments, configuration of sidelink resource pool shall ensure there is no specific number of sub-channels in the PSCCH region, and/or the number of sub-channels in the sidelink resource pool shall be equal to N*X*Y sub-channels such that one TTI comprising N*X*Y SL-PRS resources could be associated with one sub-channel in the PSCCH region.

Preferably in certain embodiments, one sub-channel is associated with one SL-PRS resource with one RE/comb offset.

Preferably in certain embodiments, a number of sub-channels in a TTI in the sidelink resource pool is one-to-one associated with one SL-PRS resource with one RE/comb offset in the TTI.

Preferably in certain embodiments, the first device determines CR based on a portion of the sub-channel with RSSI measured by signal strength over the sub-channel in the PSCCH region in one TTI.

Preferably in certain embodiments, the first device determines CBR based on a portion of the sub-channel (associated with/of) PSCCH scheduling or reserving SL-PRS resource.

Preferably in certain embodiments, the configuration shall ensure a number of sub-channels in a TTI in the sidelink resource pool is at least larger than or equal to N*X*Y SL-PRS resources, wherein N is comb-N structure corresponding how many SL-PRS resources are RE-level multiplexed, wherein X is a number of SL-PRS occasions in one TTI, and Y is a number of SL-PRS frequency ranges.

Preferably in certain embodiments, X could be 1 or larger than 1.

Preferably in certain embodiments, Y could be 1 or larger than 1.

Preferably in certain embodiments, N could be 1, 2, 3, 4, 6, or 12.

Preferably in certain embodiments, N could be 8 or 10.

Preferably in certain embodiments, the sidelink resource pool is configured with one or more comb-N structures for SL-PRS resource.

Preferably in certain embodiments, one SL-PRS resource with one RE/comb offset is spreading or occupying among all sub-channels in the sidelink resource pool.

Preferably in certain embodiments, one SL-PRS resource with one RE/comb offset is spreading or occupying among a subset of sub-channels in the sidelink resource pool.

Preferably in certain embodiments, one SL-PRS resource with one RE/comb offset is spreading or occupying among sub-channels in one PRS frequency range in the sidelink resource pool.

Preferably in certain embodiments, one SL-PRS resource with one RE/comb offset is in one SL-PRS occasion in one TTI.

Preferably in certain embodiments, there are one or more SL-PRS occasions in one TTI.

Preferably in certain embodiments, there are one or more (SL) PRS frequency ranges in one SL-PRS occasion.

Preferably in certain embodiments, for each TTI in the sidelink resource pool, a number of SL-PRS occasions in each TTI is the same.

Preferably in certain embodiments, for each TTI in the sidelink resource pool, a number of SL-PRS frequency ranges in each TTI or in each SL-PRS occasion is the same.

Preferably in certain embodiments, the sidelink resource pool comprises at least a first configuration and a second configuration.

Preferably in certain embodiments, based on the first and the second configuration, the sidelink resource pool comprises a first set of TTI and a second set of TTI.

Preferably in certain embodiments, TTI in the first set of TTI and TTI in the second set of TTI are associated with a same/different number of SL-PRS occasions, same/different number of SL-PRS frequency ranges, same/different size/BW of SL-PRS, same/different granularity of SL-PRS, same/different comb-N, same/different number of M symbols for one SL-PRS occasion, structure of SL-PRS, and/or same/different specific starting frequency location for transmitting SL-PRS.

Preferably in certain embodiments, the first configuration and the second configuration are associated with respective two different kinds of SL-PRS requirement.

Preferably in certain embodiments, there are one or more specific starting locations for transmitting SL-PRS, and/or configuration for the one or more specific starting locations is provided per pool, SL BWP, carrier.

Preferably in certain embodiments, the configuration associated with the sidelink resource pool could provide a number of SL-PRS frequency ranges, and/or the number of SL-PRS frequency ranges is divisible of a number of sub-channels in the sidelink resource pool, and/or each SL-PRS frequency range has the same size/BW (and number of sub-channels) for transmitting SL-PRS.

Preferably in certain embodiments, for determining RSSI, CR, CBR in a sidelink resource pool for SL-PRS, a timeline is different than RSSI, CR, CBR in a sidelink resource without performing SL-PRS transmission.

Preferably in certain embodiments, for determining RSSI, CR, CBR in a dedicated SL-PRS RP, a timeline is different than RSSI, CR, CBR in other/another sidelink RP.

Referring back to FIGS. 3 and 4, in one or more embodiments from the perspective of a first device, the device 300 includes a program code 312 stored in memory 310 of the transmitter. The CPU 308 could execute program code 312 to: (i) receive configuration for configuring a sidelink resource pool for transmitting SL-PRS, wherein TTI in the sidelink resource pool comprises PSCCH region and SL-PRS region; and (ii) determine RSSI based on sub-channel in OFDM symbols, of a TTI, configured for PSCCH. Moreover, the CPU 308 can execute the program code 312 to perform all of the described actions, steps, and methods described above, below, or otherwise herein.

Figure 13:
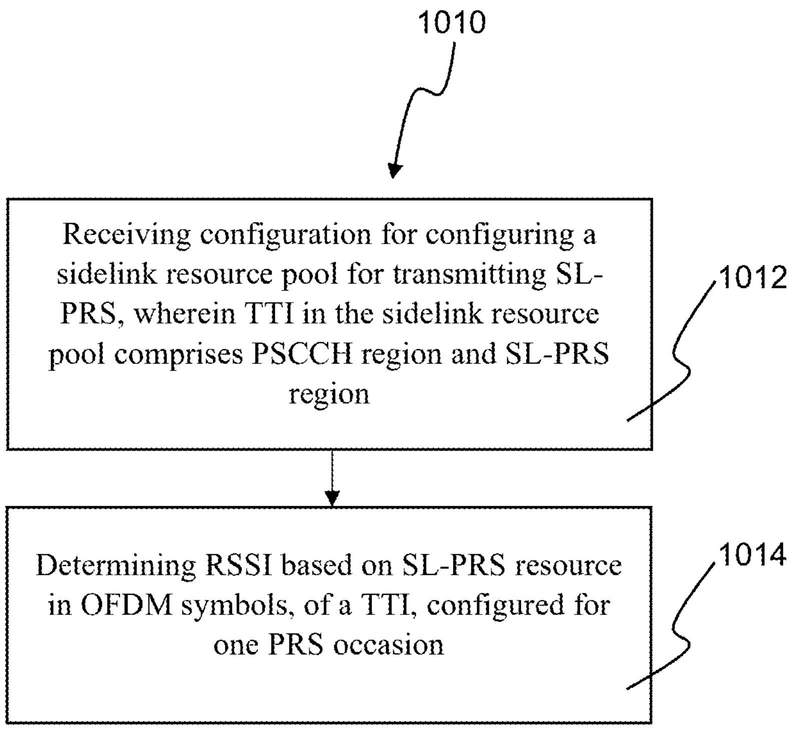
FIG. 13 is a flow diagram of a method of a first device comprising receiving configuration for configuring a sidelink resource pool for transmitting SL-PRS, and determining RSSI on SL-PRS resource in OFDM symbols, in accordance with embodiments of the present invention.

Referring to FIG. 13, with this and other concepts, systems, and methods of the present invention, a method 1010 for a first device performing sidelink reference signal transmission in a wireless communication system comprises receiving configuration for configuring a sidelink resource pool for transmitting SL-PRS, wherein TTI in the sidelink resource pool comprises PSCCH region and SL-PRS region (step 1012), and determining RSSI based on SL-PRS resource in OFDM symbols, of a TTI, configured for one PRS occasion (step 1014).

Preferably in certain embodiments, the first device determines CR NOT based on all REs in sub-channels where SL-PRS resource occupies.

Preferably in certain embodiments, the first device determines CR based on a number of SL-PRS resources within a first interval.

Preferably in certain embodiments, the first device determines CBR based on a number of SL-PRS resources within a second interval.

Preferably in certain embodiments, the linear average signal strength for determining RSSI for one SL-PRS resource is performed based on those REs associated with the one SL-PRS resource.

Preferably in certain embodiments, one SL-PRS resource with one RE/comb offset is spreading or occupying one sub-channel in the sidelink resource pool.

Preferably in certain embodiments, one SL-PRS resource with one RE/comb offset is spreading or occupying among all sub-channels in the sidelink resource pool.

Preferably in certain embodiments, one SL-PRS resource with one RE/comb offset is spreading or occupying among a subset of sub-channels in the sidelink resource pool.

Preferably in certain embodiments, one SL-PRS resource with one RE/comb offset is spreading or occupying among sub-channels in one PRS frequency range in the sidelink resource pool.

Preferably in certain embodiments, one SL-PRS resource with one RE/comb offset is in one SL-PRS occasion in one TTI.

Preferably in certain embodiments, there are one or more SL-PRS occasions in one TTI.

Preferably in certain embodiments, there are one or more (SL) PRS frequency ranges in one SL-PRS occasion.

Preferably in certain embodiments, for each TTI in the sidelink resource pool, a number of SL-PRS occasions in each TTI is the same.

Preferably in certain embodiments, for each TTI in the sidelink resource pool, a number of SL-PRS frequency ranges in each TTI or in each SL-PRS occasion is the same.

Preferably in certain embodiments, there are one or more specific starting locations for transmitting SL-PRS, and/or configuration for the one or more specific starting locations is provided per pool, SL BWP, carrier.

Referring back to FIGS. 3 and 4, in one or more embodiments from the perspective of a first device, the device 300 includes a program code 312 stored in memory 310 of the transmitter. The CPU 308 could execute program code 312 to: (i) receive configuration for configuring a sidelink resource pool for transmitting SL-PRS, wherein TTI in the sidelink resource pool comprises PSCCH region and SL-PRS region; and (ii) determine RSSI based on SL-PRS resource in OFDM symbols, of a TTI, configured for one PRS occasion. Moreover, the CPU 308 can execute the program code 312 to perform all of the described actions, steps, and methods described above, below, or otherwise herein.

Figure 14:
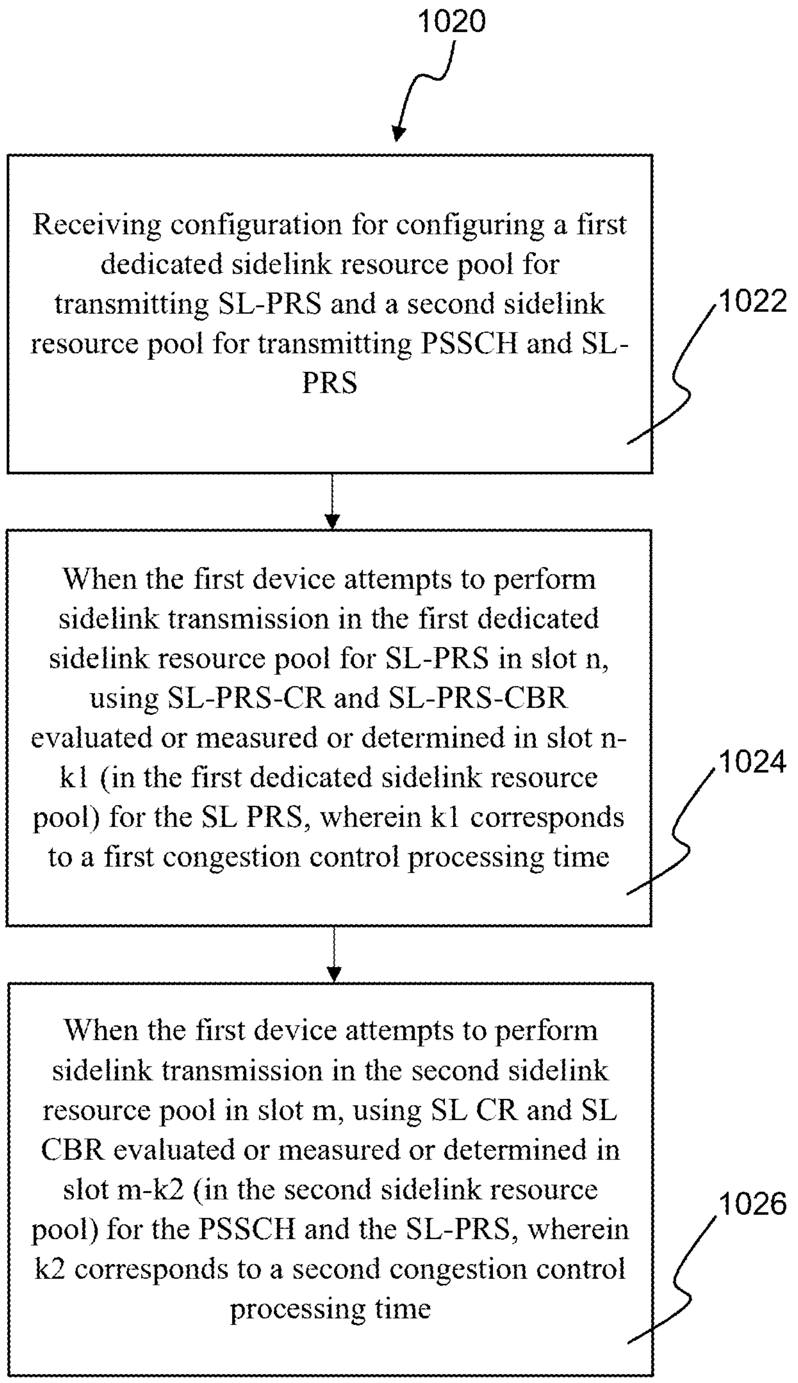
FIG. 14 is a flow diagram of a method of a first device comprising receiving configuration for configuring a first dedicated sidelink resource pool for transmitting SL-PRS and a second sidelink resource pool for transmitting PSSCH and SL-PRS, using SL-PRS-CR and SL-PRS-CBR when the first device attempts to perform sidelink transmission in the first dedicated sidelink resource pool, and using SL CR and SL CBR when the first device attempts to perform sidelink transmission in the second sidelink resource pool, in accordance with embodiments of the present invention.

Referring to FIG. 14, with this and other concepts, systems, and methods of the present invention, a method 1020 for a first device performing sidelink reference signal transmission in a wireless communication system comprises receiving configuration for configuring a first dedicated sidelink resource pool for transmitting SL-PRS and a second sidelink resource pool for transmitting PSSCH and SL-PRS (step 1022), and when the first device attempts to perform sidelink transmission in the first dedicated sidelink resource pool for SL-PRS in slot n, using SL-PRS-CR and SL-PRS-CBR evaluated or measured or determined in slot n-k1 (in the first dedicated sidelink resource pool) for the SL PRS, wherein k1 corresponds to a first congestion control processing time (step 1024), and when the first device attempts to perform sidelink transmission in the second sidelink resource pool in slot m, using SL CR and SL CBR evaluated or measured or determined in slot m-k2 (in the second sidelink resource pool) for the PSSCH and the SL-PRS, wherein k2 corresponds to a second congestion control processing time (step 1026).

Preferably in certain embodiments, k2 is smaller than or equal to k1.

Preferably in certain embodiments, k2 is equal to k1.

Preferably in certain embodiments, the SL-PRS-CR in slot n-k1 is determined based on a first ratio, wherein the first ratio is a first number of SL-PRS resources, which is granted or used by the first device in a first time interval, divided by a total number of SL-PRS resources in the first time interval, and/or the SL-PRS-CBR in slot n-k1 based on a second ratio, wherein the second ratio is a second number of SL-PRS resources, which corresponding SL-PRS-RSSI is larger than a threshold in a second time interval, divided by a total number of SL-PRS resources in the second time interval.

Preferably in certain embodiments, the SL CR in slot m-k2 is determined based on a first ratio, wherein the first ratio is a first number of sub-channels, which is granted or used by the first device in a first time interval, divided by a total number of sub-channels in the first time interval, and/or the SL CBR in slot m-k2 based on a second ratio, wherein the second ratio is a second number of sub-channels, which corresponding SL RSSI is larger than a threshold in a second time interval, divided by a total number of sub-channels in the second time interval.

Preferably in certain embodiments, when the first device attempts to or has or determines to perform sidelink transmission in the first dedicated sidelink resource pool for SL-PRS, wherein the sidelink transmission is associated with a first priority, the first device utilizes the first priority for checking CR limit, and/or when the first device attempts to or has or determines to transmit a PSSCH and a SL-PRS in the same slot in the second sidelink resource pool, the first device utilizes a higher priority between PSSCH priority and SL-PRS priority (or a smaller priority value between PSSCH priority value and SL-PRS priority value) for checking CR limit.

Preferably in certain embodiments, when the first device attempts to transmit SL PRS in a slot j, the first device would determine using either the first congestion control processing time or the second congestion control processing time for transmitting the SL PRS based on either the first dedicated sidelink resource pool or the second sidelink resource pool for transmitting the SL PRS in the slot j. Preferably in certain embodiments, no matter which sidelink resource pool is used for transmitting the SL PRS in the slot j, the first device determines using the second congestion control processing time for transmitting the SL PRS. Preferably in certain embodiments, the first device would use or determine congestion control processing time based on larger value between the first congestion control processing time and the second congestion control processing time for the SL PRS.

Preferably in certain embodiments, the first dedicated sidelink resource pool for transmitting SL-PRS and the second sidelink resource pool for transmitting PSSCH are associated with a single same Sub-carrier Spacing (SCS) or in a single same SL BWP or carrier, and/or both the first dedicated sidelink resource pool for transmitting SL-PRS and the second sidelink resource pool for transmitting at least PSSCH are associated with or configured with 15 KHz sub-carrier spacing.

Preferably in certain embodiments, the k1 corresponding to the first congestion control processing time is subject to a first UE capability for congestion control of sidelink resource pool for transmitting at least PSSCH.

Preferably in certain embodiments, the k2 corresponding to the second congestion control processing time is subject to a second UE capability for congestion control of dedicated sidelink resource pool for transmitting SL-PRS.

Preferably in certain embodiments, one SL-PRS resource with one RE/comb offset is spreading bandwidth of the first dedicated sidelink resource pool, and/or each SL-PRS resource in the first dedicated sidelink resource pool is spreading bandwidth of the first dedicated sidelink resource pool, and/or OFDM symbols for PSCCH and OFDM symbols for SL-PRS are separated in one slot in the first dedicated sidelink resource pool.

Preferably in certain embodiments, OFDM symbols for SL-PRS in a slot comprises one or more SL-PRS occasions in the slot in the first dedicated sidelink resource pool, wherein the one or more SL-PRS occasions comprise at least a first SL-PRS occasion and a second SL-PRS occasion, which are separated in different OFDM symbols, and/or a first SL-PRS resource in the first SL-PRS occasion could be configured with a same or different comb offset than a second SL-PRS resource in the second SL-PRS occasion, and/or a first SL-PRS resource in the first SL-PRS occasion could be configured with same or different contiguous OFDM symbols than a second SL-PRS resource in the second SL-PRS occasion, and/or a first SL-PRS resource in the first SL-PRS occasion could be configured with a same or different starting OFDM symbol than a second SL-PRS resource in the second SL-PRS occasion.

Preferably in certain embodiments, each slot in the first dedicated sidelink resource pool comprises a same number of SL-PRS resources, and/or the first device determines the total number of SL-PRS resources in a slot based on the configuration for configuring the first dedicated sidelink resource pool.

Preferably in certain embodiments, the first device is configured in sidelink resource allocation mode 2 for both the first dedicated sidelink resource pool for transmitting SL-PRS and the second sidelink resource pool for at least transmitting PSSCH.

Preferably in certain embodiments, the first device transmits PSSCH or PSSCH with SL-PRS in the slot m in the second sidelink resource pool, and/or no matter if sidelink transmission in the slot m in the second sidelink resource pool comprises SL-PRS or not, the first device uses SL CR and SL CBR evaluated or measured or determined in slot m-k2 for the sidelink transmission.

Preferably in certain embodiments, the first device is in RRC connected state or in idle state. Referring back to FIGS. 3 and 4, in one or more embodiments from the perspective of a first device, the device 300 includes a program code 312 stored in memory 310 of the transmitter. The CPU 308 could execute program code 312 to: (i) receive configuration for configuring a first dedicated sidelink resource pool for transmitting SL-PRS and a second sidelink resource pool for transmitting PSSCH and SL-PRS; (ii) when the first device attempts to perform sidelink transmission in the first dedicated sidelink resource pool for SL-PRS in slot n, using SL-PRS-CR and SL-PRS-CBR evaluated or measured or determined in slot n-k1 (in the first dedicated sidelink resource pool) for the SL PRS, wherein k1 corresponds to a first congestion control processing time; and (iii) when the first device attempts to perform sidelink transmission in the second sidelink resource pool in slot m, using SL CR and SL CBR evaluated or measured or determined in slot m-k2 (in the second sidelink resource pool) for the PSSCH and the SL-PRS, wherein k2 corresponds to a second congestion control processing time. Moreover, the CPU 308 can execute the program code 312 to perform all of the described actions, steps, and methods described above, below, or otherwise herein.

Figure 15:
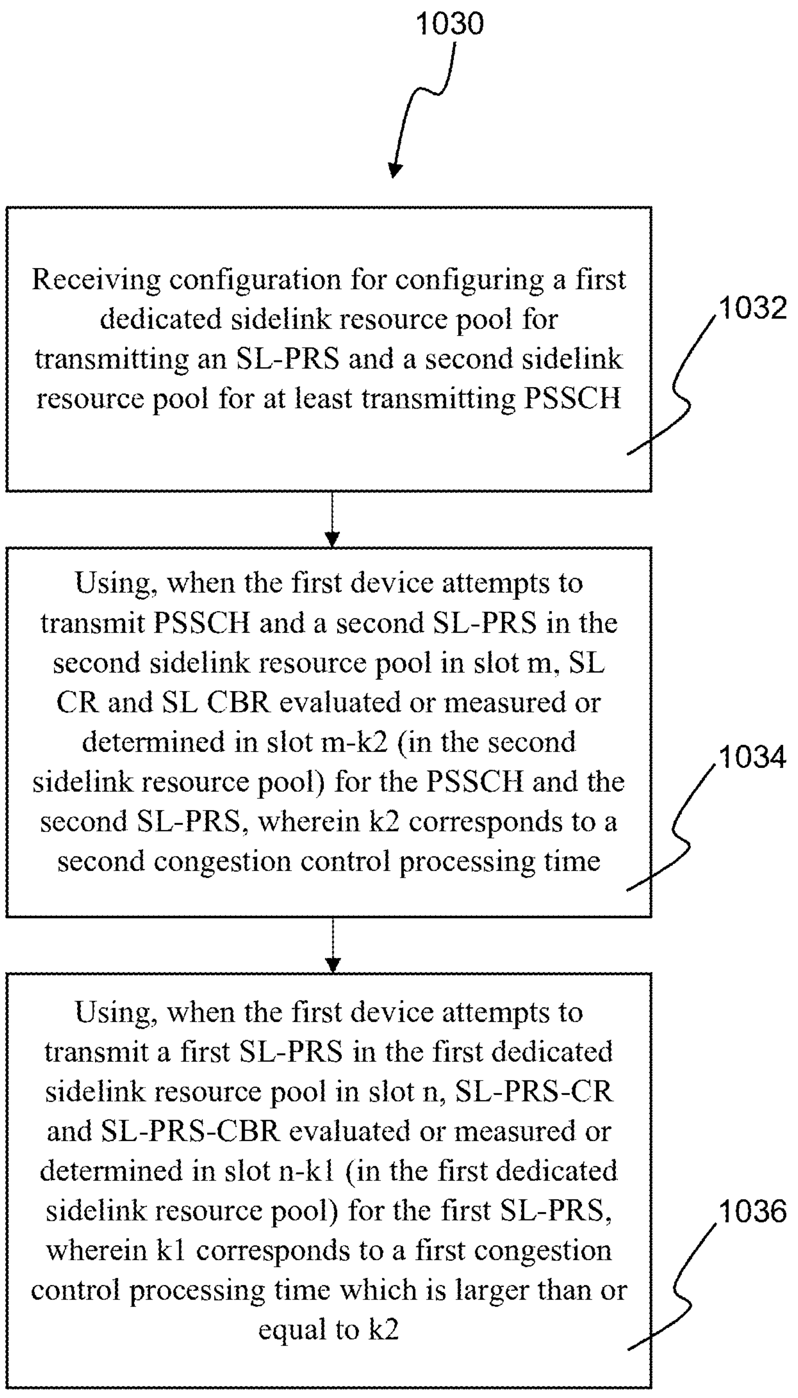
FIG. 15 is a flow diagram of a method of a first device comprising receiving configuration for configuring a first dedicated sidelink resource pool for transmitting a SL-PRS and a second sidelink pool for at least transmitting PSSCH, using SL CR and SL CBR when the first device attempts to transmit PSSCH and a second SL-PRS in the second sidelink resource pool, and using SL-PRS-CR and SL-PRS-CBR when the first device attempts to transmit a first SL-PRS in the first dedicated sidelink resource pool, in accordance with embodiments of the present invention.

Referring to FIG. 15, with this and other concepts, systems, and methods of the present invention, a method 1030 for a first device in a wireless communication system comprises receiving configuration for configuring a first dedicated sidelink resource pool for transmitting an SL-PRS and a second sidelink resource pool for at least transmitting PSSCH (step 1032); using, when the first device attempts to transmit PSSCH and a second SL-PRS in the second sidelink resource pool in slot m, SL CR and SL CBR evaluated or measured or determined in slot m-k2 (in the second sidelink resource pool) for the PSSCH and the second SL-PRS, wherein k2 corresponds to a second congestion control processing time (step 1034); and using, when the first device attempts to transmit a first SL-PRS in the first dedicated sidelink resource pool in slot n, SL-PRS-CR and SL-PRS-CBR evaluated or measured or determined in slot n-k1 (in the first dedicated sidelink resource pool) for the first SL-PRS, wherein k1 corresponds to a first congestion control processing time which is larger than or equal to k2 (step 1036).

Preferably in certain embodiments, the SL-PRS-CR in slot n-k1 is determined based on a first ratio, wherein the first ratio is a first number of SL-PRS resources, which is granted or used by the first device in a first time interval, divided by a total number of SL-PRS resources in the first time interval; and/or the SL-PRS-CBR in slot n-k1 is based on a second ratio, wherein the second ratio is a second number of SL-PRS resources, corresponding to a SL-PRS-RSSI larger than a threshold in a second time interval, divided by a total number of SL-PRS resources in the second time interval. Preferably, the first interval corresponds to [n-k1-a, n-k1+b], wherein a and b are determined such that a+b+1=1000 or 1000.24 slots. Preferably, the first interval comprises slots in the first dedicated sidelink resource pool. Preferably, the second interval corresponds to [n-k1-a, n-k1-1], wherein a is equal to 100 or 100-24 slots. Preferably, the second interval comprises slots in the first dedicated sidelink resource pool.

Preferably in certain embodiments, the SL CR in slot m-k2 is determined based on a first ratio, wherein the first ratio is a first number of sub-channels, granted, or used by the first device in a first time interval, divided by a total number of sub-channels in the first time interval; and/or the SL CBR in slot m-k2 is based on a second ratio, wherein the second ratio is a second number of sub-channels, corresponding to a SL RSSI larger than a threshold in a second time interval, divided by a total number of sub-channels in the second time interval. Preferably, the first interval corresponds to [m-k2-a, m-k2+b], wherein a and b are determined such that a+b+1=1000 or 1000-24 slots. Preferably, the first interval comprises slots in the second sidelink resource pool. Preferably, the second interval corresponds to [m-k2-a, m-k2-1], wherein a is equal to 100 or 100.2" slots. Preferably, the second interval comprises slots in the second sidelink resource pool.

Preferably in certain embodiments, when the first device attempts to or has or determines to transmit the first SL-PRS in the first dedicated sidelink resource pool, wherein the first SL-PRS is associated with a first priority, the first device utilizes the first priority for checking or determining SL-PRS-CR limit; and/or when the first device attempts to or has or determines to transmit the PSSCH and the second SL-PRS in a same slot in the second sidelink resource pool, the first device utilizes a higher priority between PSSCH priority and SL-PRS priority (or a smaller priority value between PSSCH priority value and SL-PRS priority value) for checking or determining SL CR limit.

Preferably in certain embodiments, when the first device attempts to transmit SL PRS in a slot j, the first device would determine using either the first congestion control processing time or the second congestion control processing time for transmitting the SL PRS based on which of either the first dedicated sidelink resource pool or the second sidelink resource pool for transmitting the SL PRS in the slot j. Preferably in certain embodiments, no matter which sidelink resource pool is used for transmitting the SL PRS in the slot j, the first device determines using the second congestion control processing time for transmitting the SL PRS. Preferably in certain embodiments, the first device would use or determine congestion control processing time based on larger value between the first congestion control processing time and the second congestion control processing time for the SL PRS.

Preferably in certain embodiments, the first dedicated sidelink resource pool and the second sidelink resource pool are associated with a single same SCS or in a single same BWP or carrier; and/or both the first dedicated sidelink resource pool and the second sidelink resource pool are associated with or configured with 15 KHz sub-carrier spacing.

Preferably in certain embodiments, the k2 corresponding to the second congestion control processing time is subject to a second capability of the first device for congestion control of sidelink resource pool for transmitting at least PSSCH (e.g., a second UE capability for congestion control of sidelink resource pool for transmitting at least PSSCH), and/or the k1 corresponding to the first congestion control processing time is subject to a first capability of the first device for congestion control of dedicated sidelink resource pool for transmitting SL-PRS (e.g., a first UE capability for congestion control of dedicated sidelink resource pool for transmitting SL-PRS); and/or the k1 corresponds to the first congestion control processing time irrespective of being larger than or equal to k2; and/or the k1 corresponds to the first congestion control processing time no matter being larger than or equal to k2.

Preferably in certain embodiments, the method further comprises using, when the first device attempts to transmit another PSSCH without multiplexing SL-PRS in the second sidelink resource pool in slot i, SL CR and SL CBR evaluated or measured or determined in slot i-k2 (in the second sidelink resource pool) for the another PSSCH, wherein k2 corresponds to the second congestion control processing time; and/or using k2 corresponding to the second congestion control processing time, irrespective of whether one PSSCH transmission in the second sidelink resource pool multiplexes SL-PRS or not, for evaluating or measuring or determining SL CR and SL CBR for the one PSSCH transmission.

Preferably in certain embodiments, there are no PSSCH resources or transmissions in the first dedicated sidelink resource pool; and/or one SL-PRS resource with one RE or comb offset spreads bandwidth of the first dedicated sidelink resource pool (in PRB level); and/or each SL-PRS resource in the first dedicated sidelink resource pool spreads bandwidth of the first dedicated sidelink resource pool (in PRB level); and/or OFDM symbols for PSCCH and OFDM symbols for SL-PRS are separated in one slot in the first dedicated sidelink resource pool; and/or the transmission of the second SL-PRS in the second sidelink resource pool utilizes a same bandwidth (in PRB level or sub-channel level) as transmission of the PSSCH.

Preferably in certain embodiments, OFDM symbols for SL-PRS in a slot comprises one or more SL-PRS occasions in the slot in the first dedicated sidelink resource pool, wherein the one or more SL-PRS occasions comprise at least a first SL-PRS occasion and a second SL-PRS occasion, separated in different OFDM symbols; and/or a first SL-PRS resource in the first SL-PRS occasion is configured with a same or a different comb offset than a second SL-PRS resource in the second SL-PRS occasion; and/or a first SL-PRS resource in the first SL-PRS occasion is configured with a same or a different number of contiguous OFDM symbols than a second SL-PRS resource in the second SL-PRS occasion; and/or a first SL-PRS resource in the first SL-PRS occasion is configured with a different starting OFDM symbol than a second SL-PRS resource in the second SL-PRS occasion.

Preferably in certain embodiments, the first device is configured in sidelink resource allocation mode 2 for both the first dedicated sidelink resource pool and the second sidelink resource pool; and/or the first device is in an RRC connected state or in an idle state.

Referring back to FIGS. 3 and 4, in one or more embodiments from the perspective of a first device, the device 300 includes a program code 312 stored in memory 310 of the transmitter. The CPU 308 could execute program code 312 to: (i) receive configuration for configuring a first dedicated sidelink resource pool for transmitting an SL-PRS and a second sidelink resource pool for at least transmitting PSSCH; (ii) using, when the first device attempts to transmit PSSCH and a second SL-PRS in the second sidelink resource pool in slot m, SL CR and SL CBR evaluated or measured or determined in slot m-k2 (in the second sidelink resource pool) for the PSSCH and the second SL-PRS, wherein k2 corresponds to a second congestion control processing time; and (iii) using, when the first device attempts to transmit a first SL-PRS in the first dedicated sidelink resource pool in slot n, SL-PRS-CR and SL-PRS-CBR evaluated or measured or determined in slot n-k1 (in the first dedicated sidelink resource pool) for the first SL-PRS, wherein k1 corresponds to a first congestion control processing time which is larger than or equal to k2. Moreover, the CPU 308 can execute the program code 312 to perform all of the described actions, steps, and methods described above, below, or otherwise herein.

Figure 16:
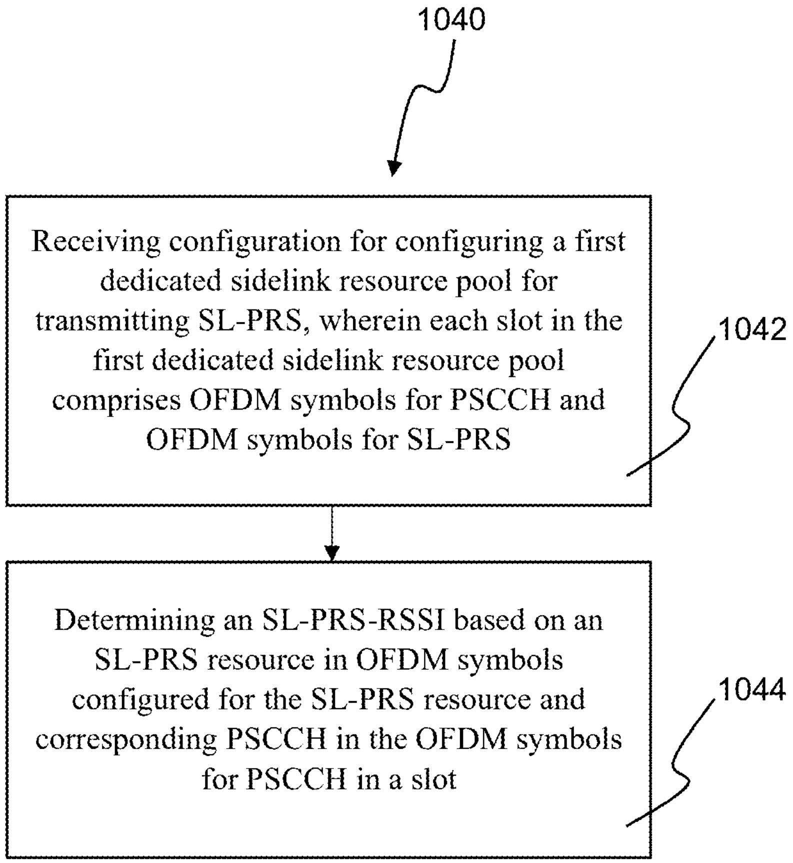
FIG. 16 is a flow diagram of a method of a first device comprising receiving configuration for configuring a first dedicated sidelink resource pool for transmitting SL-PRS, and determining an SL-PRS-RSSI based on an SL-PRS resource in OFDM symbols, in accordance with embodiments of the present invention.

Referring to FIG. 16, with this and other concepts, systems, and methods of the present invention, a method 1040 for a first device performing sidelink reference signal transmission in a wireless communication system comprises receiving configuration for configuring a first dedicated sidelink resource pool for transmitting SL-PRS, wherein each slot in the first dedicated sidelink resource pool comprises OFDM symbols for PSCCH and OFDM symbols for SL-PRS (step 1042); and determining an SL-PRS-RSSI based on an SL-PRS resource in OFDM symbols configured for the SL-PRS resource and corresponding PSCCH in the OFDM symbols for PSCCH in a slot (step 1044).

Preferably in certain embodiments, one SL-PRS resource with one RE or comb offset spreads bandwidth of the first dedicated sidelink resource pool; and/or each SL-PRS resource in the first dedicated sidelink resource pool spreads bandwidth of the first dedicated sidelink resource pool; and/or OFDM symbols for PSCCH and OFDM symbols for SL-PRS are separated in one slot.

Preferably in certain embodiments, the determination of the SL-PRS-RSSI is based on linear average signal strength of the SL-PRS resource in OFDM symbols configured for the SL-PRS resource and corresponding PSCCH in the OFDM symbols for PSCCH in a slot.

Preferably in certain embodiments, the method further comprises determining SL-PRS-CR in a slot based on a first ratio, wherein the first ratio is a first number of SL-PRS resources, granted or used by the first device in a first time interval, divided by a total number of SL-PRS resources in the first time interval; and/or determining SL-PRS-CBR in a slot based on a second ratio, wherein the second ratio is a second number of SL-PRS resources, corresponding to an SL-PRS-RSSI larger than a threshold in a second time interval, divided by a total number of SL-PRS resources in the second time interval.

Preferably in certain embodiments, when the first device attempts to perform sidelink transmission in the first dedicated sidelink resource pool for SL-PRS in slot n, the first device uses SL-PRS-CR and SL-PRS-CBR evaluated or measured or determined in slot n-k, wherein k corresponds to congestion control processing time; and/or congestion control processing time for the first dedicated sidelink resource pool for SL-PRS is different than congestion control processing time for another sidelink resource pool for PSSCH; and/or congestion control processing time for the first dedicated sidelink resource pool for SL-PRS is larger than congestion control processing time for another sidelink resource pool for PSSCH.

Preferably in certain embodiments, the received configuration further configures a second sidelink resource pool for PSSCH and optionally for SL-PRS; and/or the first device determines SL RSSI based on sub-channels of PSSCH in OFDM symbols and sub-channels of a corresponding PSCCH in OFDM symbols in a slot.

Preferably in certain embodiments, the method further comprises determining SL CR in a slot based on a first ratio, wherein the first ratio is a first number of sub-channels, granted or used by the first device in a first time interval, divided by a total number of sub-channels in the first time interval; and/or determining SL CBR in a slot based on a second ratio, wherein the second ratio is a second number of sub-channels, corresponding to an SL RSSI larger than a threshold in a second time interval, divided by a total number of sub-channels in the second time interval.

Preferably in certain embodiments, when the first device attempts to or has or determines to perform sidelink transmission in the first dedicated sidelink resource pool for SL-PRS, wherein the sidelink transmission is associated with a first priority, the first device utilizes the first priority for checking CR limit; and/or when the first device attempts to or has or determines to transmit a PSSCH and an SL-PRS in the same slot in the second sidelink resource pool, the first device utilizes a higher priority between PSSCH priority and SL-PRS priority (or a smaller priority value between PSSCH priority value and SL-PRS priority value) for checking CR limit.

Preferably in certain embodiments, the OFDM symbols for SL-PRS in a slot comprises one or more SL-PRS occasions in the slot, wherein the one or more SL-PRS occasions comprises at least a first SL-PRS occasion and a second SL-PRS occasion, which are separated in different OFDM symbols; and/or a first SL-PRS resource in the first SL-PRS occasion is configured with a same or different comb size than a second SL-PRS resource in the second SL-PRS occasion; and/or a first SL-PRS resource in the first SL-PRS occasion is configured with same or different contiguous OFDM symbols than a second SL-PRS resource in the second SL-PRS occasion; and/or a first SL-PRS resource in the first SL-PRS occasion is configured with a same or different starting OFDM symbol than a second SL-PRS resource in the second SL-PRS occasion.

Preferably in certain embodiments, each slot in the first dedicated sidelink resource pool comprises a same number of SL-PRS resources; and/or the first device determines the total number of SL-PRS resources in a slot based on the configuration for configuring the first dedicated sidelink resource pool.

Referring back to FIGS. 3 and 4, in one or more embodiments from the perspective of a first device, the device 300 includes a program code 312 stored in memory 310 of the transmitter. The CPU 308 could execute program code 312 to: (i) receive configuration for configuring a first dedicated sidelink resource pool for transmitting SL-PRS, wherein each slot in the first dedicated sidelink resource pool comprises OFDM symbols for PSCCH and OFDM symbols for SL-PRS; and (ii) determine an SL-PRS-RSSI based on an SL-PRS resource in OFDM symbols configured for the SL-PRS resource and corresponding PSCCH in the OFDM symbols for PSCCH in a slot. Moreover, the CPU 308 can execute the program code 312 to perform all of the described actions, steps, and methods described above, below, or otherwise herein.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first device, comprising:

receiving configuration for configuring a first dedicated sidelink resource pool for transmitting a Sidelink Positioning Reference Signal (SL-PRS) and a second sidelink resource pool for at least transmitting Physical Sidelink Shared Channel (PSSCH);

using, when the first device attempts to transmit PSSCH and a second SL-PRS in the second sidelink resource pool in slot m, Sidelink Channel Occupancy Ratio (SL CR) and Sidelink Channel Busy Ratio (SL CBR) evaluated or measured or determined in slot m-k2 for the PSSCH and the second SL-PRS, wherein k2 corresponds to a second congestion control processing time; and using, when the first device attempts to transmit a first SL-PRS in the first dedicated sidelink resource pool in slot n, SL-PRS-CR and SL-PRS-CBR evaluated or measured or determined in slot n-k1 for the first SL-PRS, wherein k1 corresponds to a first congestion control processing time which is larger than or equal to k2.

2. The method of claim 1, wherein:

the SL-PRS-CR in slot n-k1 is determined based on a first ratio, wherein the first ratio is a first number of SL-PRS resources, which is granted or used by the first device in a first time interval, divided by a total number of SL-PRS resources in the first time interval; and/or the SL-PRS-CBR in slot n-k1 is based on a second ratio, wherein the second ratio is a second number of SL-PRS resources, corresponding to an SL-PRS-Received Signal Strength Indicator (RSSI) larger than a threshold in a second time interval, divided by a total number of SL-PRS resources in the second time interval.

3. The method of claim 1, wherein:

the SL CR in slot m-k2 is determined based on a first ratio, wherein the first ratio is a first number of sub-channels, granted or used by the first device in a first time interval, divided by a total number of sub-channels in the first time interval; and/or the SL CBR in slot m-k2 is based on a second ratio, wherein the second ratio is a second number of sub-channels, corresponding to an SL RSSI larger than a threshold in a second time interval, divided by a total number of sub-channels in the second time interval.

4. The method of claim 1, wherein:

when the first device attempts to or has or determines to transmit the first SL-PRS in the first dedicated sidelink resource pool, wherein the first SL-PRS is associated with a first priority, the first device utilizes the first priority for checking or determining SL-PRS-CR limit; and/or when the first device attempts to or has or determines to transmit the PSSCH and the second SL-PRS in a same slot in the second sidelink resource pool, the first device utilizes a higher priority between PSSCH priority and SL-PRS priority for checking or determining SL CR limit.

5. The method of claim 1, wherein:

the first dedicated sidelink resource pool and the second sidelink resource pool are associated with a single same Sub-Carrier Spacing (SCS) or in a single same SL Bandwidth Part (BWP) or carrier; and/or both the first dedicated sidelink resource pool and the second sidelink resource pool are associated with or configured with 15 KHz sub-carrier spacing.

6. The method of claim 1, wherein:

the k2 corresponding to the second congestion control processing time is subject to a second capability of the first device for congestion control of sidelink resource pool for transmitting at least PSSCH, and/or the k1 corresponding to the first congestion control processing time is subject to a first capability of the first device for congestion control of dedicated sidelink resource pool for transmitting SL-PRS; and/or the k1 corresponds to the first congestion control processing time irrespective of being larger than or equal to k2; and/or the k1 corresponds to the first congestion control processing time no matter being larger than or equal to k2.

7. The method of claim 1, further comprising:

using, when the first device attempts to transmit another PSSCH without multiplexing SL-PRS in the second sidelink resource pool in slot i, SL CR and SL CBR evaluated or measured or determined in slot i-k2 for the another PSSCH, wherein k2 corresponds to the second congestion control processing time; and/or using k2 corresponding to the second congestion control processing time, irrespective of whether one PSSCH transmission in the second sidelink resource pool multiplexes SL-PRS or not, for evaluating or measuring or determining SL CR and SL CBR for the one PSSCH transmission.

8. The method of claim 1, wherein:

there are no PSSCH resources or transmissions in the first dedicated sidelink resource pool; and/or one SL-PRS resource with one Resource Element (RE) or comb offset spreads bandwidth of the first dedicated sidelink resource pool; and/or each SL-PRS resource in the first dedicated sidelink resource pool spreads bandwidth of the first dedicated sidelink resource pool; and/or Orthogonal Frequency Division Multiplexing (OFDM) symbols for Physical Sidelink Control Channel (PSCCH) and OFDM symbols for SL-PRS are separated in one slot in the first dedicated sidelink resource pool; and/or the transmission of the second SL-PRS in the second sidelink resource pool utilizes a same bandwidth as transmission of the PSSCH.

9. The method of claim 1, wherein:

OFDM symbols for SL-PRS in a slot comprises one or more SL-PRS occasions in the slot in the first dedicated sidelink resource pool, wherein the one or more SL-PRS occasions comprise at least a first SL-PRS occasion and a second SL-PRS occasion, separated in different OFDM symbols; and/or a first SL-PRS resource in the first SL-PRS occasion is configured with a same or a different comb offset than a second SL-PRS resource in the second SL-PRS occasion; and/or a first SL-PRS resource in the first SL-PRS occasion is configured with a same or a different number of contiguous OFDM symbols than a second SL-PRS resource in the second SL-PRS occasion; and/or a first SL-PRS resource in the first SL-PRS occasion is configured with a different starting OFDM symbol than a second SL-PRS resource in the second SL-PRS occasion.

10. The method of claim 1, wherein:

the first device is configured in sidelink resource allocation mode 2 for both the first dedicated sidelink resource pool and the second sidelink resource pool; and/or the first device is in a Radio Resource Control (RRC) connected state or in an idle state.

11. A method of a first device for performing sidelink reference signal transmission, comprising:

receiving configuration for configuring a first dedicated sidelink resource pool for transmitting Sidelink Positioning Reference Signal (SL-PRS), wherein each slot in the first dedicated sidelink resource pool comprises Orthogonal Frequency Division Multiplexing (OFDM) symbols for Physical Sidelink Control Channel (PSCCH) and OFDM symbols for SL-PRS; and determining an SL-PRS-Received Signal Strength Indicator (RSSI) based on an SL-PRS resource in OFDM symbols configured for the SL-PRS resource and corresponding PSCCH in the OFDM symbols for PSCCH in a slot, wherein:

when the first device attempts to perform sidelink transmission in the first dedicated sidelink resource pool for SL-PRS in slot n, the first device uses SL-PRS-Channel Occupancy Ratio (CR) and SL-PRS-Channel Busy Ratio (CBR) evaluated or measured or determined in slot n-k, wherein k corresponds to congestion control processing time, congestion control processing time for the first dedicated sidelink resource pool for SL-PRS is different than congestion control processing time for another sidelink resource pool for Physical Sidelink Shared Channel (PSSCH), and/or congestion control processing time for the first dedicated sidelink resource pool for SL-PRS is larger than congestion control processing time for another sidelink resource pool for PSSCH.

12. The method of claim 11, wherein:

one SL-PRS resource with one Resource Element (RE) or comb offset spreads bandwidth of the first dedicated sidelink resource pool; and/or each SL-PRS resource in the first dedicated sidelink resource pool spreads bandwidth of the first dedicated sidelink resource pool; and/or OFDM symbols for PSCCH and OFDM symbols for SL-PRS are separated in one slot.

13. The method of claim 11, wherein:

the determination of the SL-PRS-RSSI is based on linear average signal strength of the SL-PRS resource in OFDM symbols configured for the SL-PRS resource and corresponding PSCCH in the OFDM symbols for PSCCH in a slot.

14. The method of claim 11, further comprising:

determining SL-PRS-CR in a slot based on a first ratio, wherein the first ratio is a first number of SL-PRS resources, granted or used by the first device in a first time interval, divided by a total number of SL-PRS resources in the first time interval; and/or determining SL-PRS-CBR in a slot based on a second ratio, wherein the second ratio is a second number of SL-PRS resources, corresponding to an SL-PRS-RSSI larger than a threshold in a second time interval, divided by a total number of SL-PRS resources in the second time interval.

15. The method of claim 11, wherein:

the received configuration further configures a second sidelink resource pool for PSSCH and optionally for SL-PRS; and/or the first device determines SL RSSI based on sub-channels of PSSCH in OFDM symbols and sub-channels of a corresponding PSCCH in OFDM symbols in a slot.

16. The method of claim 15, further comprising:

determining SL CR in a slot based on a first ratio, wherein the first ratio is a first number of sub-channels, granted or used by the first device in a first time interval, divided by a total number of sub-channels in the first time interval; and/or determining SL CBR in a slot based on a second ratio, wherein the second ratio is a second number of sub-channels, corresponding to an SL RSSI larger than a threshold in a second time interval, divided by a total number of sub-channels in the second time interval.

17. The method of claim 15, wherein:

when the first device attempts to or has or determines to perform sidelink transmission in the first dedicated sidelink resource pool for SL-PRS, wherein the sidelink transmission is associated with a first priority, the first device utilizes the first priority for checking CR limit; and/or when the first device attempts to or has or determines to transmit a PSSCH and an SL-PRS in a same slot in the second sidelink resource pool, the first device utilizes a higher priority between PSSCH priority and SL-PRS priority for checking CR limit.

18. The method of claim 11, wherein:

the OFDM symbols for SL-PRS in a slot comprises one or more SL-PRS occasions in the slot, wherein the one or more SL-PRS occasions comprises at least a first SL-PRS occasion and a second SL-PRS occasion, which are separated in different OFDM symbols; and/or a first SL-PRS resource in the first SL-PRS occasion is configured with a same or different comb size than a second SL-PRS resource in the second SL-PRS occasion; and/or a first SL-PRS resource in the first SL-PRS occasion is configured with same or different contiguous OFDM symbols than a second SL-PRS resource in the second SL-PRS occasion; and/or a first SL-PRS resource in the first SL-PRS occasion is configured with a same or different starting OFDM symbol than a second SL-PRS resource in the second SL-PRS occasion.

19. A first device, comprising:

a memory; and a processor operatively coupled to the memory, wherein the processor is configured to execute a program code to:

receive configuration for configuring a first dedicated sidelink resource pool for transmitting a Sidelink Positioning Reference Signal (SL-PRS) and a second sidelink resource pool for at least transmitting Physical Sidelink Shared Channel (PSSCH);

use, when the first device attempts to transmit PSSCH and a second SL-PRS in the second sidelink resource pool in slot m, Sidelink Channel Occupancy Ratio (SL CR) and Sidelink Channel Busy Ratio (SL CBR) evaluated or measured or determined in slot m-k2 for the PSSCH and the second SL-PRS, wherein k2 corresponds to a second congestion control processing time; and use, when the first device attempts to transmit a first SL-PRS in the first dedicated sidelink resource pool in slot n, SL-PRS-CR and SL-PRS-CBR evaluated or measured or determined in slot n-k1 for the first SL-PRS, wherein k1 corresponds to a first congestion control processing time which is larger than or equal to k2.

* * * * *